United States Patent
Wang et al.

(10) Patent No.: US 11,863,439 B2
(45) Date of Patent: Jan. 2, 2024

(54) METHOD, APPARATUS AND STORAGE MEDIUM FOR APPLICATION IDENTIFICATION

(71) Applicant: HUAWEI TECHNOLOGIES CO., LTD., Guangdong (CN)

(72) Inventors: Lu Wang, Nanjing (CN); Qi Luo, Nanjing (CN); Zhuojun Hua, Nanjing (CN); Chuntao Wang, Nanjing (CN); Linjie Huang, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 103 days.

(21) Appl. No.: 17/691,463

(22) Filed: Mar. 10, 2022

(65) Prior Publication Data
US 2022/0200902 A1    Jun. 23, 2022

Related U.S. Application Data

(63) Continuation of application No. PCT/CN2020/112316, filed on Aug. 29, 2020.

(30) Foreign Application Priority Data

Sep. 10, 2019 (CN) .......................... 201910853338.4

(51) Int. Cl.
*H04L 45/00* (2022.01)
*H04L 43/0876* (2022.01)
(Continued)

(52) U.S. Cl.
CPC ............ *H04L 45/46* (2013.01); *H04L 43/026* (2013.01); *H04L 43/0876* (2013.01);
(Continued)

(58) Field of Classification Search
None
See application file for complete search history.

(56) References Cited

U.S. PATENT DOCUMENTS 8,291,495 B1    10/2012 Burns et al.
9,477,718 B2 *  10/2016 Zhou .................. G06F 16/2465
(Continued)

FOREIGN PATENT DOCUMENTS

CN    102984243 A    3/2013
CN    103051725 A    4/2013
(Continued)

OTHER PUBLICATIONS

S. Wadhwa et al.,"Protocol for Access Node Control Mechanism in Broadband Networks;draft-ietf-ancp-protocol-15", Network Working Group, Internet-Draft,Feb. 2, 2011, Total 71 Pages.

*Primary Examiner* — Lashonda Jacobs-Burton
(74) *Attorney, Agent, or Firm* — Gregg Jansen

(57) ABSTRACT

This application discloses a method, apparatus and storage medium for application identification. A network device performs flow behavior feature analysis according to a flow table to obtain a plurality of services. Each service includes one IP address and one port identifier, and one application may usually include a group of services. Therefore, the network device clusters the plurality of services according to the flow table and a domain name table, to obtain a plurality of application types. Each application type includes a plurality of services. Each application type corresponds to one application. Further, the network device may determine a label corresponding to each of the plurality of application types, the label identifying an application to which a data flow belongs.

20 Claims, 4 Drawing Sheets

(51) Int. Cl.
*H04L 45/302* (2022.01)
*H04L 43/026* (2022.01)
*H04L 47/2483* (2022.01)
*H04L 45/74* (2022.01)

(52) U.S. Cl.
CPC ............ *H04L 45/306* (2013.01); *H04L 45/54* (2013.01); *H04L 45/74* (2013.01); *H04L 47/2483* (2013.01)

(56) References Cited

U.S. PATENT DOCUMENTS

| | | | | |
|---|---|---|---|---|
| 10,855,604 | B2* | 12/2020 | Tigli | H04L 43/022 |
| 10,999,175 | B2* | 5/2021 | Chen | G06F 18/00 |
| 11,456,952 | B2* | 9/2022 | Subrahmanya | H04L 45/38 |
| 2010/0192225 | A1* | 7/2010 | Ma | G06F 21/552 |
| | | | | 709/224 |
| 2014/0188837 | A1 | 7/2014 | Zhou et al. | |
| 2015/0169457 | A1* | 6/2015 | Jackson | G06F 12/121 |
| | | | | 711/135 |
| 2019/0222499 | A1* | 7/2019 | Chen | G06F 18/24147 |
| 2020/0169509 | A1* | 5/2020 | Tigli | H04L 47/2441 |
| 2020/0328966 | A1* | 10/2020 | Wang | H04L 12/4641 |

FOREIGN PATENT DOCUMENTS

| | | |
|---|---|---|
| CN | 106534145 A | 3/2017 |
| CN | 108173705 A | 6/2018 |
| EP | 2768203 A1 | 8/2014 |

\* cited by examiner

METHOD, APPARATUS AND STORAGE MEDIUM FOR APPLICATION IDENTIFICATION

CROSS-REFERENCE TO RELATED APPLICATIONS

This application is a continuation of International Application No. PCT/CN2020/112316, filed on Aug. 29, 2020, which claims priority to Chinese Patent Application No. 201910853338.4, filed on Sep. 10, 2019. The disclosures of the aforementioned applications are hereby incorporated by reference in their entireties.

TECHNICAL FIELD

This application relates to the field of communications technologies, and in particular, to a method, apparatus and storage medium for application identification.

BACKGROUND

Currently, private networks such as an enterprise network and a campus network may encounter congestion and packet loss due to burst traffic. In addition, some new and unknown applications go online, and this may further exacerbate the foregoing problems. The new and unknown applications are usually private applications of an enterprise. Therefore, how to identify the private applications of the enterprise has become an important issue for an enterprise user.

Currently, an application may be identified by using a deep packet inspection (DPI) technology. The DPI technology is mainly used to perform deep packet inspection on a data flow to extract a traffic feature, and then match the extracted traffic feature with data stored in a traffic feature database, to identify an application corresponding to the data flow.

A traffic feature database needs to be maintained in the DPI technology, and when a new application appears, the traffic feature database also needs to be manually updated to identify the new application. Consequently, an application identification rate is relatively low.

SUMMARY

This application provides a method, apparatus and storage medium for application identification. This resolves a relatively low application identification rate of a related DPI technology. The technical solutions are as follows.

According to a first aspect, a method for application identification is provided. The method includes:

separately extracting features from a plurality of data flows, to obtain a flow table and a domain name table, where the flow table includes a plurality of flow entries, each of the plurality of flow entries includes a 5-tuple and a flow start time point, the domain name table includes a plurality of domain name entries, and each of the plurality of domain name entries includes a source Internet Protocol (IP) address, a destination domain name, a destination IP address, and a domain name type;

performing flow behavior feature analysis according to the flow table, to obtain a plurality of services, where each service includes one IP address and one port identifier;

clustering the plurality of services according to the flow table and the domain name table, to obtain a plurality of application types; and determining a label corresponding to each of the plurality of application types, where the label is used to identify an application to which a data flow belongs.

One data flow may include one or more packets, and the one or more packets have a same 5-tuple. In other words, one or more packets with a same 5-tuple may form one data flow.

The 5-tuple in the flow table includes a source IP address, a source port, a destination IP address, a destination port, and a protocol number. For example, it is assumed that a client currently needs to send a packet to a server. A source IP address and a source port are an IP address and a port of the client, a destination IP address and a destination port are an IP address and a port of the server, and a protocol number is a number of a transmission protocol used for communication between the client and the server.

The flow start time point of each data flow is a receiving time point of a first packet in each data flow. However, the first packet in each data flow may not be a first packet in the entire data flow, but a first packet in packets received when the features are currently extracted.

The domain name type in the domain name table has two formats: A.name and C.name. The A.name is used to resolve a host name or a domain name to an IP address. The C.name resolves a plurality of host names or domain names to another domain name, and then resolves the another domain name to an IP address, where the IP address is the same as the IP address to which the A.name resolves. In other words, a plurality of C.names are equivalent to branches of one A.name.

Flow behavior feature analysis is performed according to the flow table, to obtain the plurality of services. Each service includes one IP address and one port identifier, and one application may usually include a group of services. Therefore, after the plurality of services are clustered according to the flow table and the domain name table, the plurality of application types may be obtained, where each application type includes a plurality of services, and each application type corresponds to one application. In this case, a label corresponding to each of the plurality of application types may be determined. Therefore, the label may be used to identify an application to which a data flow belongs. It may be learned that an application may be identified based on a flow behavior feature without a traffic feature database. In this case, when a new application appears, the new application may be directly identified based on an IP address and a port of a server accessed by the new application. This improves an application identification rate.

Optionally, the performing flow behavior feature analysis according to the flow table, to obtain a plurality of services includes:

determining a port with a loop according to the flow table, to obtain a loop port set;

determining a single-client access service set and a first multi-client access service set based on the loop port set and according to the flow table, where each service in the single-client access service set is accessed by a single client, an IP address and a port of the service belong to a same side, and the port does not belong to the loop port set; and each service in the first multi-client access service set is accessed by a plurality of clients, an IP address and a port of the service belong to a same side, and the port does not belong to the loop port set;

determining a second multi-client access service set based on the loop port set and the first multi-client access service set and according to the flow table, where each service in the second multi-client access service set is accessed by a plurality of clients, an IP address and a port of the service belong to different sides, and the port does not belong to the loop port set; and combining the first multi-client access service set, the second multi-client access service set, and the single-client access service set, to obtain the plurality of services.

Optionally, the determining a port with a loop according to the flow table includes:

obtaining, for each port in the flow table, a same-side IP address set and a peer-side IP address set of the port according to the flow table;

determining an intersection between the same-side IP address set and the peer-side IP address set of the port, to obtain a plurality of IP addresses;

determining, according to the flow table, a total flow quantity of data flows that correspond to the plurality of IP addresses and that are in all data flows passing through the port, and using the determined total flow quantity as a first total flow quantity;

if the first total flow quantity is greater than a first threshold, determining a total flow quantity of all data flows passing through the port, and using the determined total flow quantity as a second total flow quantity; and if a ratio of the first total flow quantity to the second total flow quantity is greater than a second threshold, determining that the port is a port with a loop.

The same-side IP address set of the port is a set of IP addresses on a same side as the port, and the peer-side IP address set of the port is a set of IP addresses on different sides from the port. The port with a loop means that source-end IP addresses and destination-end IP addresses of most data flows passing through the port are the same, that is, source-end devices and destination-end devices of most data flows passing through the port are same devices.

Usually, the plurality of IP addresses determined by using the intersection between the same-side IP address set and the peer-side IP address set of the port are IP addresses of both the source-end devices and the destination-end devices. In this case, the port may be considered as a potential port with a loop. To further verify whether the port is a port with a loop, the first total flow quantity may be determined. If the first total flow quantity is greater than the first threshold, the second total flow quantity and the ratio of the first total flow quantity to the second total flow quantity may further be determined. If the ratio is greater than the second threshold, it may indicate that the source-end IP addresses and the destination-end IP addresses of most data flows passing through the port are the same, that is, the source-end devices and the destination-end devices of most data flows passing through the port are same devices, and the port may further be determined as a port with a loop.

Optionally, the determining a single-client access service set and a first multi-client access service set based on the loop port set and according to the flow table includes:

determining, according to the flow table, a service that is accessed by a single client and whose IP address and port belong to a same side, and a service that is accessed by a plurality of clients and whose IP address and port belong to a same side, to obtain a potential single-client access service set and a first potential multi-client access service set; and selecting, from the potential single-client access service set, a service at which a port in the loop port set is located, to obtain the single-client access service set, and selecting, from the first potential multi-client access service set, a service at which a port in the loop port set is located, to obtain the first multi-client access service set.

Optionally, the determining, according to the flow table, a service that is accessed by a single client and whose IP address and port belong to a same side, and a service that is accessed by a plurality of clients and whose IP address and port belong to a same side includes:

determining a plurality of target services according to the flow table, where each target service corresponds to an IP address and a port in one flow entry that belong to a same side, and each target service corresponds to a plurality of data flows;

determining, for each of the plurality of target services, whether a port of the target service is randomly generated;

if the port of the target service is randomly generated, determining whether a quantity of same-side ports corresponding to the IP address of the target service is greater than a third threshold;

if the quantity of same-side ports corresponding to the IP address of the target service is greater than the third threshold, determining whether a quantity of peer-side ports corresponding to the target service is greater than a fourth threshold; and if the quantity of peer-side ports corresponding to the target service is greater than the fourth threshold, determining that the target service is the service that is accessed by a plurality of clients and whose IP address and port belong to the same side; or if the quantity of peer-side ports corresponding to the target service is not greater than the fourth threshold, determining whether a peer-side IP address of the target service is unique; and if the peer-side IP address of the target service is unique, determining that the target service is the service that is accessed by a single client and whose IP address and port belong to the same side.

In the flow table, if a plurality of data flows correspond to an IP address and a port in one flow entry that belong to the same side, the IP address and the port may be used as the target service. In other words, one target service may include a source IP address and a source port, or may include a destination IP address and a destination port.

The target service corresponds to an IP address and a port in one flow entry that belong to a same side, and the target service corresponds to the plurality of data flows. In other words, in the flow table, if the plurality of data flows correspond to an IP address and a port in one flow entry that belong to the same side, the IP address and the port may be used as the target service. For example, if the plurality of data flows in the flow table correspond to a destination IP address and a destination port in one flow entry, the destination IP address and the destination port may be determined as the target service. Similarly, if the plurality of data flows in the flow table correspond to a source IP address and a source port in one flow entry, the source IP address and the source port may be determined as the target service.

The target service corresponds to an IP address and a port in one flow entry that belong to a same side, and the target service corresponds to the plurality of data flows, that is, the IP address and the port of the target service may be an IP address and a port of the server. In other words, the target service may be the service that is accessed by a plurality of clients and whose IP address and port belong to the same side. Therefore, in this case, to further determine whether the target service is the service that is accessed by a plurality of clients and whose IP address and port belong to the same side, whether the port of the target service is randomly generated may further be determined. If the port of the target service is randomly generated, whether the target service is the service that is accessed by a plurality of clients and whose IP address and port belong to the same side cannot be determined, and whether the quantity of same-side ports corresponding to the IP address of the target service is greater than the third threshold further needs to be determined.

Optionally, the determining whether a port of the target service is randomly generated further includes:
  if the port of the target service is not randomly generated, determining that the target service is the service that is accessed by a plurality of clients and whose IP address and port belong to the same side.

If a port number of the port of the target service is less than 1024, the port is determined as a well-known port, that is, the port is not randomly generated. If a port number of the port of the target service is greater than 1024, it is determined that the port is randomly generated.

Optionally, after the determining whether a quantity of same-side ports corresponding to the IP address of the target service is greater than a third threshold, the method further includes:
  if the quantity of same-side ports corresponding to the IP address of the target service is not greater than the third threshold, determining that the target service is the service that is accessed by a plurality of clients and whose IP address and port belong to the same side.

Optionally, the determining a second multi-client access service set based on the loop port set and the first multi-client access service set and according to the flow table includes:
  determining, based on the first multi-client access service set and according to the flow table, a service that is accessed by a plurality of clients and whose IP address and port belong to different sides, to obtain a second potential multi-client access service set; and
  selecting, from the second potential multi-client access service set, a service at which a port in the loop port set is located, to obtain the second multi-client access service set.

Optionally, the determining, based on the first multi-client access service set and according to the flow table, a service that is accessed by a plurality of clients and whose IP address and port belong to different sides includes:
  determining an IP address and a port that are in a same flow entry in the flow table and that belong to different sides as one reference service, to obtain a plurality of reference services;
  determining, for each of the plurality of reference services, whether the reference service corresponds to a plurality of data flows;
  if the reference service corresponds to the plurality of data flows, determining whether a port of the reference service is randomly generated;
  if the port of the reference service is not randomly generated, determining whether the port of the reference service is included in the first multi-client access service set;
  if the port of the reference service is not included in the first multi-client access service set, determining whether an IP address of the reference service is included in the source IP addresses in the domain name table; and
  if the IP address of the reference service is not included in the source IP addresses in the domain name table, determine that the reference service is the service that is accessed by a plurality of clients and whose IP address and port belong to different sides.

The reference service also includes an IP address and a port. Different from the target service, the IP address and the port of the reference service belong to different sides. For example, a destination IP address and a source port in a same flow entry may form a reference service. Alternatively, a source IP address and a destination port in a same flow entry may form a reference service.

In some cases, in the flow table obtained through feature extraction, the source IP address and the destination IP address may be reversed. Consequently, the source IP address included in the reference service may be incorrectly used as a destination IP address, or the destination IP address is incorrectly used as a source IP address. In this case, it cannot be determined whether the IP address and port of the reference service are an IP address and a port that are in a same flow entry and that belong to different sides. However, the source IP addresses in the domain name table are the correct source IP addresses. Therefore, if it is determined that the IP address of the reference service is not included in the source IP addresses in the domain name table, the reference service is determined as the service that is accessed by a plurality of clients and whose IP address and port belong to different sides.

Optionally, the clustering the plurality of services according to the flow table and the domain name table, to obtain a plurality of application types includes:
  performing time-correlated clustering on the plurality of services according to the flow table and the domain name table, to obtain a time-correlated clustering result;
  selecting a periodic service from the plurality of services according to the flow table, to obtain a periodic clustering result;
  obtaining a plurality of first services and a plurality of second services from the plurality of services according to the domain name table, where the plurality of first services are services that are accessed by a plurality of clients and that correspond to domain names, and the plurality of second services include a service that is accessed by a plurality of clients and that does not correspond to domain names and a service that is accessed by a single client;
  performing semantic-correlated clustering on the plurality of first services, to obtain a semantic-correlated clustering result;
  performing client-similarity clustering on the plurality of second services, to obtain a client-similarity clustering result; and
  merging the time-correlated clustering result, the periodic clustering result, the semantic-correlated clustering result, and the client-similarity clustering result, to obtain the plurality of application types.

It can be learned from the foregoing description that the plurality of services include a service accessed by a plurality of clients and a service accessed by a single client, and each domain name entry in the domain name table includes the source IP address, the destination domain name, the destination IP address, and the domain name type. Therefore, for the services accessed by a plurality of clients, whether each of the plurality of services corresponds to a domain name may be determined from the domain name table, and then a service that is accessed by a plurality of clients and corresponds to a domain name is selected from the plurality of services, to obtain the plurality of first services. In addition, the service that is accessed by a plurality of clients and does not correspond to a domain name can be selected.

Optionally, the performing time-correlated clustering on the plurality of services according to the flow table and the domain name table, to obtain a time-correlated clustering result includes:

obtaining, according to the flow table, a flow start time point in a flow entry in which each of the plurality of services is located;

determining a time difference between every two services in the plurality of services based on the obtained flow start time point;

determining time correlation between every two services in the plurality of services based on the determined time difference;

selecting, from the plurality of services based on the time correlation between every two services in the plurality of services, a service that meets a time correlation condition;

generating a similarity matrix based on time correlation between the selected services;

determining a spectral clustering result of the plurality of services through spectral cluster analysis based on the similarity matrix;

determining a similarity between every two services in the plurality of services according to the domain name table; and determining the time-correlated clustering result based on the similarity between every two services in the plurality of services and the spectral clustering result.

Optionally, the selecting a periodic service from the plurality of services according to the flow table includes:

for each of the plurality of services, obtaining, according to the flow table, flow start time points of the plurality of data flows of the service accessed by a same client;

determining a time difference between every two adjacent flow start time points based on a sequence of the flow start time points of the plurality of data flows of the accessed service;

determining whether a periodicity of the service is a strong periodicity through a Fourier transform based on the determined time difference; and if the periodicity of the service is a strong periodicity, determining that the service is a periodic service.

Optionally, the performing semantic-correlated clustering on the plurality of first services, to obtain a semantic-correlated clustering result includes:

clustering the plurality of first services based on domain name semantic correlation, to obtain a plurality of first clustering results;

combining the plurality of first clustering results based on domain name similarity between the plurality of first clustering results, to obtain a plurality of second clustering results; and clustering an unclustered service and the plurality of second clustering results based on domain name semantic correlation between the unclustered service in the plurality of first services and each second clustering result, to obtain the semantic-correlated clustering result.

Optionally, the clustering the plurality of first services based on domain name semantic correlation includes:

obtaining, from the plurality of first services, a plurality of third services that are accessed by a plurality of clients and correspond to a unique domain name, and obtaining, from the plurality of first services, a plurality of fourth services that are accessed by a plurality of clients and correspond to a plurality of domain names;

obtaining combinable domain names from the domain names corresponding to the plurality of fourth services, and combining the combinable domain names to obtain a plurality of first domain names;

removing a number and a symbol from each first domain name, and removing a number and a symbol from the domain name corresponding to each third service, to obtain a plurality of second domain names;

clustering services corresponding to the plurality of second domain names based on semantic correlation of the plurality of second domain names; and clustering services corresponding to domain names that are not combinable based on semantic correlation of the domain names that are not combinable in the domain names corresponding to the plurality of fourth services.

Because the plurality of first services are services accessed by a plurality of clients, for each first service, a domain name corresponding to the first service may be determined from the domain name table. If the domain name corresponding to the first service is unique, the first service is determined as a third service that is accessed by a plurality of clients and that corresponds to a unique domain name. If the domain name corresponding to the first service is not unique, the first service is determined as a fourth service that is accessed by a plurality of clients and that corresponds to a plurality of domain names.

Optionally, the performing client-similarity clustering on the plurality of second services, to obtain a client-similarity clustering result includes:

determining an IP address of a client accessing each of the plurality of second services; and clustering the plurality of second services based on intersection over union of the IP addresses of the clients accessing each second service, to obtain the client-similarity clustering result.

Optionally, the determining a label corresponding to each of the plurality of application types includes:

dividing the plurality of application types into a first application group, a second application group, and a third application group, where a service included in each application type in the first application group corresponds to a domain name, a service included in each application type in the second application group does not correspond to a domain name, and each application type in the third application group corresponds to a service that is not clustered;

determining a label corresponding to each application type based on the domain name corresponding to the service included in each application type in the first application group; and determining a label corresponding to each application type in the second application group and a label corresponding to each application type in the third application group.

After determining the label corresponding to each of the plurality of application types, the network device may further display the label corresponding to each of the plurality of application types.

According to a second aspect, an apparatus for application identification is provided, and the apparatus for application identification has a function of implementing the method for application identification in the first aspect. The apparatus for application identification includes at least one module, and the at least one module is configured to implement the method for application identification in the first aspect.

According to a third aspect, a network device is provided. The network device includes a processor and a memory. The memory is configured to store a program for performing the method for application identification in the first aspect, and store data used to implement the method for application identification in the first aspect. The processor is configured to execute the program stored in the memory. The network device may further include a communications bus, and the communications bus is used to establish a connection between the processor and the memory.

According to a fourth aspect, a computer-readable storage medium is provided. The computer-readable storage medium stores instructions; and when the instructions are run on a computer, the computer is enabled to perform the method for application identification in the first aspect.

According to a fifth aspect, a computer program product including instructions is provided. When the computer program product is run on a computer, the computer is enabled to perform the method for application identification in the first aspect.

The technical solutions provided in this application can bring at least the following beneficial effects:

Flow behavior feature analysis is performed according to the flow table, to obtain the plurality of services. Each service includes one IP address and one port identifier, and one application may usually include a group of services. Therefore, after the plurality of services are clustered according to the flow table and the domain name table, the plurality of application types may be obtained, where each application type includes a plurality of services, and each application type corresponds to one application. In this case, a label corresponding to each of the plurality of application types may be determined. Therefore, the label may be used to identify an application to which a data flow belongs. It may be learned that in this application, an application may be identified based on a flow behavior feature without a traffic feature database. In this case, when a new application appears, the new application may be directly identified based on an IP address and a port of a server accessed by the new application. This improves an application identification rate.

DESCRIPTION OF EMBODIMENTS

To make objectives, technical solutions, and advantages of this application clearer, the following further describes embodiments of this application in detail with reference to the accompanying drawings.

Before a method for application identification according to the embodiments of this application is described, an application scenario of the embodiments of this application is first described.

A key service and a non-key service usually exist in private networks such as an enterprise network and a campus network. When the non-key service occupies relatively large bandwidth, the key service occupies relatively small bandwidth. In this case, small bandwidth may affect quality of the key service. In addition, a key service of an enterprise is usually a service corresponding to a private application of the enterprise. Therefore, the private application of the enterprise usually needs to be identified, so that a network administrator of the enterprise can configure some policies that can improve quality of the key service, and correspondingly the quality of the key service is improved. For example, for the private application of the enterprise, bandwidth required for normal running of the private application may be ensured. For a public network application, traffic-limiting processing may be performed. Traffic-limiting processing is not performed on a data flow corresponding to the private application, and traffic-limiting processing is performed on a data flow corresponding to the public network application. This improves the quality of the key service.

It is clear that this application is applied to a scenario that is described above and in which a traffic-limiting policy is used to ensure the quality of the key service. This application may further be applied to another scenario. Other scenarios are not listed one by one in this application.

Figure 1:
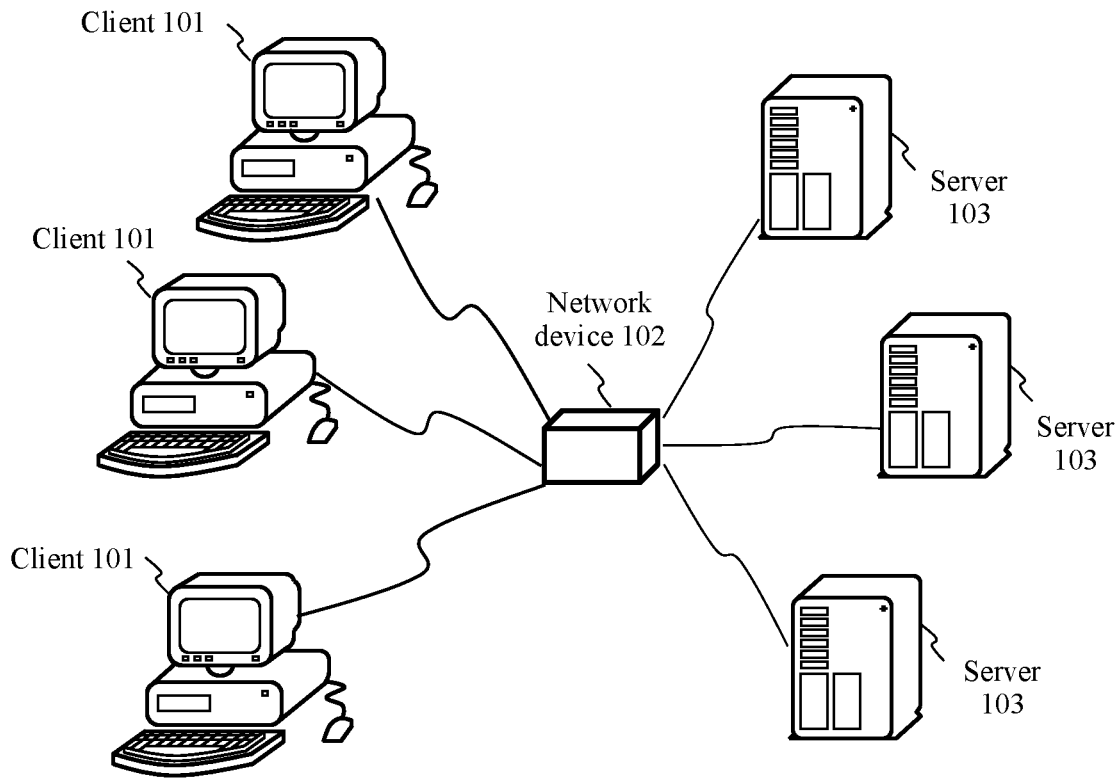
FIG. 1 is a diagram of an architecture of an application identification system according to an embodiment of this application.

FIG. 1 is a diagram of an architecture of an application identification system according to an embodiment of this application. The system includes a plurality of clients 101, one network device 102, and a plurality of servers 103. Each client 101 is connected to the network device 102 in a wired or wireless manner for communication. Each server 103 is also connected to the network device 102 in a wired or wireless manner for communication.

An application is installed on any one of the plurality of clients 101. When the client 101 runs the application, data flows are generated. In this case, the client 101 may send the data flows to the network device 102. When receiving the data flows, the network device 102 may process the data flows, to identify an application corresponding to the data flows. Then, when the data flows are transmitted to the server 103, the server 103 may process the data flows in response to an operation of the client 101.

The application installed on the client 101 may be a private application, or may be a public network application. The private application is an application used within an enterprise, and the public network application is an application that can be used by anyone. For example, the private application may be an application used for communication within an enterprise, and the public network application may be an application used for communication between the enterprise and an external service.

The client 101 may be any electronic product that can perform human-computer interaction with a user in one or more manners such as a keyboard, a touchpad, a touchscreen, a remote controller, a voice interaction device, or a handwriting device, for example, a personal computer (PC), a mobile phone, a smartphone, a personal digital assistant (PDA), a wearable device, a pocket personal computer (PPC), a tablet, a smart head unit, a smart television, a smart speaker, or the like.

The network device 102 may be a core switch, an access switch, a router, or another device. The server 103 may be a server, a server cluster including a plurality of servers, or a cloud computing service center.

In FIG. 1, only three clients and three servers are used to describe the application identification system. This does not constitute a limitation on this embodiment of this application. In addition, the method for application identification provided in the embodiments of this application may be applied to identifying both a private application of an enterprise and a public network application.

Figure 2:
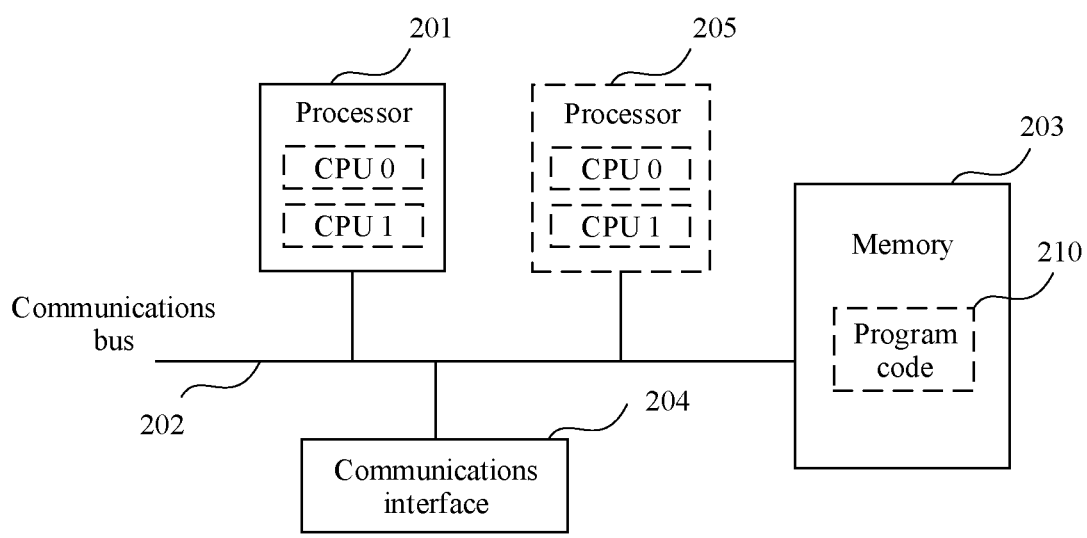
FIG. 2 is a diagram of a computer device according to an embodiment of this application.

FIG. 2 is a diagram of a computer device according to an embodiment of this application. The computer device may be the client 101, the network device 102, or the server 103 shown in FIG. 1. The computer device includes at least one processor 201, a communications bus 202, a memory 203, and at least one communications interface 204.

The processor 201 may be a general-purpose central processing unit (CPU), a network processor (NP), a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The communications bus 202 is used to transmit information between the foregoing components. The communications bus 202 may be classified into an address bus, a data bus, a control bus, or the like. For ease of representation, only one thick line is used to represent the bus in the figure, but this does not mean that there is only one bus or only one type of bus.

The memory 203 may be a read-only memory (ROM) or another type of static storage device that can store static information and/or instructions, or a random access memory (RAM) or another type of dynamic storage device that can store information and/or instructions. Alternatively, the memory 203 may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by the network device. However, the memory 203 is not limited thereto. The memory 203 may exist independently, and be connected to the processor 201 through the communications bus 202. Alternatively, the memory 203 may be integrated with the processor 201.

The communications interface 204 is configured to communicate with another device or a communications network. The communications interface 204 includes a wired communications interface, or may include a wireless communications interface. The wired communications interface may be, for example, an Ethernet interface. The Ethernet interface may be an optical interface, an electrical interface, or a combination thereof. The wireless communications interface may be a wireless local area network (WLAN) interface, a cellular network communications interface, a combination thereof, or the like.

In an embodiment, the processor 201 may include one or more CPUs, for example, a CPU 0 and a CPU 1 shown in FIG. 2.

In an embodiment, the network device may include a plurality of processors, for example, the processor 201 and a processor 205 shown in FIG. 2. Each of the processors may be a single-core processor (single-CPU) or may be a multi-core processor (multi-CPU). The processor herein may be one or more devices, circuits, and/or processing cores configured to process data (for example, a computer program instruction).

In an embodiment, the computer device may further include an output device 206 and an input device 207. The output device 206 communicates with the processor 201, and may display information in a plurality of manners. For example, the output device 206 may be a liquid crystal display (LCD), a light emitting diode (LED) display device, a cathode ray tube (CRT) display device, or a projector. The input device 207 communicates with the processor 201, and may receive an input from a user in a plurality of manners. For example, the input device 207 may be a mouse, a keyboard, a touchscreen device, or a sensing device.

In some embodiments, the memory 203 is configured to store program code 210 for executing the solutions of this application, and the processor 201 may execute the program code 210 stored in the memory 203. For example, the computer device may implement a method for application identification provided in the following embodiment in FIG. 3 by using the processor 201 and the program code 210 in the memory 203.

Figure 3:
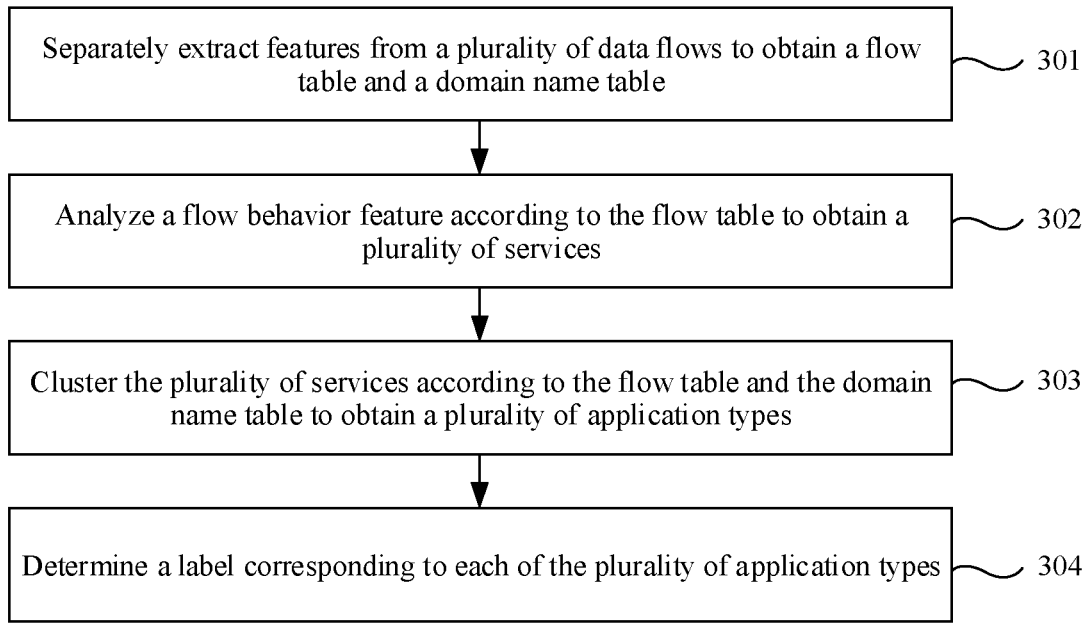
FIG. 3 is a flowchart of a method for application identification according to an embodiment of this application.

FIG. 3 is a flowchart of a method for application identification according to an embodiment of this application. The method is applied to the network device in the application identification system shown in FIG. 1. The method includes the following steps.

Step 301: A network device separately extracts features from a plurality of data flows to obtain a flow table and a domain name table, where the flow table includes a plurality of flow entries, each of the plurality of flow entries includes a 5-tuple and a flow start time point, the domain name table includes a plurality of domain name entries, and each of the plurality of domain name entries includes a source IP address, a destination domain name, a destination IP address, and a domain name type.

Usually, one data flow may include one or more packets, and the one or more packets have a same 5-tuple. In other words, one or more packets with a same 5-tuple may form one data flow. In addition, the destination domain name is a domain name corresponding to the destination IP address, and when the destination domain name is unique, the domain name type is also unique. Therefore, the network device may separately extract the 5-tuple, the destination domain name, and the domain name type in any packet included in each data flow, and determine a receiving time point of a first packet in each data flow as the flow start time point. Then, the network device may obtain the source IP address and the destination IP address from the 5-tuple, to generate the flow table based on the 5-tuple and the flow start time point of each data flow, and generate the domain name table based on the source IP address, the destination domain name, the destination IP address, and the domain name type of each data flow.

Because the 5-tuple includes a source IP address, a source port, a destination IP address, a destination port, and a protocol number, the network device may obtain the source IP address and the destination IP address of the data flow from the 5-tuple. For example, it is assumed that a client currently needs to send a packet to a server. A source IP address and a source port of the packet are an IP address and a port of the client, a destination IP address and a destination port are an IP address and a port of the server, and a protocol number is a number of a transmission protocol used for communication between the client and the server.

Based on the foregoing description, the flow start time point of each data flow is the receiving time point of the first packet in each data flow. However, the first packet in each data flow may not be a first packet in the entire data flow, but a first packet in packets received when the features are currently extracted. For example, currently features need to be separately extracted from all data flows collected between 1:30 and 2:00. It is assumed that a first packet of a data flow A is received at 1:00, and between 1:30 and 2:00, a first data packet of the data flow A is received at 1:31. In this case, a flow start time point of the data flow A is 1:31.

The domain name type has two formats: A.name and C.name. The A.name is used to resolve a host name or a domain name to an IP address. The C.name resolves a plurality of host names or domain names to another domain name, and then resolves the another domain name to an IP address, where the IP address is the same as the IP address to which the A.name resolves. In other words, a plurality of C.names are equivalent to branches of one A.name.

In this embodiment of this application, the network device may further set a trigger condition for extracting features. When the trigger condition is met, the network device separately extracts the features from the plurality of data flows. For example, when collecting data flows, the network device may determine whether a data volume of currently collected data flows reaches a data volume threshold. When the data volume of the currently collected data flows reaches the data volume threshold, the network device may separately extract features from the collected data flows. For example, the network device sets the data volume threshold to 200 M. When collecting data flows, the network device may determine whether a data volume of currently collected data flows reaches 200 M. If the data volume of the currently collected data flows reaches 200 M, the network device separately extracts features from the collected data flows.

For another example, the network device may collect statistics on a time difference between a collection start time point and a current time point. When the time difference reaches a first time threshold, the network device separately extracts features from a plurality of collected data flows. For example, the network device sets the first time threshold to 30 minutes, and may collect statistics on a time difference between a collection start time point and a current time point. If the time difference reaches 30 minutes, the network device separately extracts features from collected data flows.

The data volume threshold and the first time threshold may be set based on a requirement.

In some embodiments, after the flow table and the domain name table are obtained, the flow table and the domain name table may further be preprocessed. For example, for the flow table, the network device may deduplicate and combine the flow entries in the flow table, and then delete a flow entry with incomplete information, to obtain a preprocessed flow table. For the domain name table, the network device may deduplicate the domain name entries in the domain name table, select a domain name entry whose domain name type is A.name, and then delete a domain name entry with incomplete information, to obtain a preprocessed domain name table.

For example, the flow table and the domain name table that are obtained through feature extraction may be shown in the following Table 1 and Table 2. In Table 1, a first flow entry and a second flow entry are duplicated. In this case, the first flow entry or the second flow entry may be deleted. In addition, a 5-tuple of the second flow entry is the same as a 5-tuple of a third flow entry, but a flow start time point of the second flow entry is different from a flow start time point of the third flow entry. It is assumed that the flow start time point of the second flow entry is earlier than the flow start time point of the third flow entry. In this case, the second flow entry may be used as a combined flow entry, and the third flow entry may be deleted. In addition, after the flow entries are deduplicated and combined, a flow entry with incomplete information further needs to be deleted from the flow table. Refer to Table 1. 5-tuples of a sixth flow entry, an eighth flow entry, and an eleventh flow entry in Table 1 are incomplete, and therefore the three flow entries may be deleted. Till now, preprocessing of the flow table may be completed, and the preprocessed flow table shown in Table 3 may be obtained.

In Table 2, a first domain name entry and a second domain name entry are duplicated. In this case, the first domain name entry or the second domain name entry may be deleted. In addition, in Table 2, domain name types of a third domain name entry, a fifth domain name entry, and a seventh domain name entry are C.name. A domain name entry whose domain name type is C.name is equivalent to a branch of a domain name entry whose domain name type is A.name. Therefore, in the domain name table, a domain name entry whose domain name type is A.name may be reserved, and a domain name entry whose domain name type is C.name may be deleted. This can reserve a data flow with a distinct feature for flow behavior feature analysis, and further determine a plurality of services in a more accurate manner. In addition, after the foregoing processing is performed on the domain name table, a domain name entry with incomplete information further needs to be deleted from the domain name table. Refer to Table 2, a sixth domain name entry and an eighth domain name entry in Table 2 have incomplete information, and the two domain name entries may be deleted. Till now, preprocessing of the domain name table may be completed, and the preprocessed domain name table shown in Table 4 may be obtained.

TABLE 1

| 5-tuple | | | | |
| --- | --- | --- | --- | --- |
| Source IP | Source port | Destination IP | Destination port | Flow start time point |
| IP01 | Port01 | IP001 | Port001 | T1 |
| IP01 | Port01 | IP001 | Port001 | T1 |
| IP01 | Port01 | IP001 | Port001 | T2 |
| IP02 | Port02 | IP002 | Port002 | T3 |
| IP03 | Port03 | IP003 | Port003 | T4 |
| IP04 | | IP004 | Port004 | T5 |
| IP05 | Port05 | IP005 | Port005 | T6 |
| IP06 | Port06 | | Port006 | T7 |
| IP07 | Port07 | IP007 | Port007 | T8 |
| IP08 | Port08 | IP008 | Port008 | T9 |
| IP09 | Port09 | IP009 | | T10 |
| IP10 | Port10 | IP010 | Port010 | T11 |
| IP11 | Port11 | IP011 | Port011 | T12 |
| ... | ... | ... | ... | ... |

TABLE 2

| Source IP | Destination domain name | Destination IP | Domain name type |
|---|---|---|---|
| IP01 | abpd-jap.xxx.com | IP001 | A.name |
| IP01 | abpd-jap.xxx.com | IP001 | A.name |
| IP02 | acnd-jap.xxx.com | IP002 | C.name |
| IP03 | abnc-jp.xxx.com | IP003 | A.name |
| IP04 | afnd-hx.xxx.com | IP004 | C.name |
| IP05 |  | IP005 | A.name |
| IP06 | acjd-jap.xxx.com | IP006 | C.name |
| IP07 | abed-jap.xxx.com |  | A.name |
| IP08 | abnd-hx.xxx.com | IP008 | A.name |
| IP09 | abnt-jap.xxx.com | IP009 | A.name |
| IP10 | asnd-jp.xxx.com | IP011 | A.name |
| IP11 | atnd-jap.xxx.com | IP012 | A.name |
| IP12 | abyd-jnp.xxx.com | IP013 | A.name |
| ... | ... | ... | ... |

TABLE 3

| 5-tuple | | | | |
|---|---|---|---|---|
| Source IP | Source port | Destination IP | Destination port | Flow start time point |
| IP01 | Port01 | IP001 | Port001 | T1 |
| IP02 | Port02 | IP002 | Port002 | T3 |
| IP03 | Port03 | IP003 | Port003 | T4 |
| IP05 | Port05 | IP005 | Port005 | T6 |
| IP07 | Port07 | IP007 | Port007 | T8 |
| IP08 | Port08 | IP008 | Port008 | T9 |
| IP10 | Port10 | IP010 | Port010 | T11 |
| IP11 | Port11 | IP011 | Port011 | T12 |
| ... | ... | ... | ... | ... |

TABLE 4

| Source IP | Destination domain name | Destination IP | Domain name type |
|---|---|---|---|
| IP01 | abpd-jap.xxx.com | IP001 | A.name |
| IP03 | abnc-jp.xxx.com | IP003 | A.name |
| IP08 | abnd-hx.xxx.com | IP008 | A.name |
| IP09 | abnt-jp.xxx.com | IP009 | A.name |
| IP10 | asnd-jp.xxx.com | IP011 | A.name |
| IP11 | atnd-jap.xxx.com | IP012 | A.name |
| IP12 | abyd-jnp.xxx.com | IP013 | A.name |
| ... | ... | ... | ... |

An operation of preprocessing the flow table and the domain name table is optional. In other words, subsequent steps may be implemented according to the flow table and the domain name table that are not preprocessed, or may be implemented according to the preprocessed flow table and the preprocessed domain name table. Implementation processes are similar. In this embodiment of this application, the subsequent steps are described by using the preprocessed flow table and the preprocessed domain name table as an example. In other words, the flow table and the domain name table mentioned in the subsequent steps are the preprocessed flow table and the preprocessed domain name table.

Although the flow table and the domain name table may be obtained through step 301, data in the flow table and the domain name table is large, a quantity of flows is large, and flow behavior features are complex. Therefore, it is difficult to identify an application corresponding to the data flow from the flow table and the domain name table. However, an application usually includes a group of services, and one service includes one IP address and one port identifier. Therefore, an application corresponding to the data flow may be identified in a step-by-step manner. Step 302 is first performed, that is, flow behavior feature analysis is performed according to the flow table, to obtain a plurality of services. Then, step 303 is performed, that is, the plurality of services are clustered, to obtain a plurality of application types. Further, step 303 is performed, that is, a label corresponding to the application type is determined, and an application corresponding to the data flow is identified.

Step 302: The network device performs flow behavior feature analysis according to the flow table, to obtain the plurality of services, where each service includes one IP address and one port identifier.

In some embodiments, step 302 may be implemented by using the following steps (1) to (4).

(1) Determine a port with a loop according to the flow table, to obtain a loop port set.

In some embodiments, for each port in the flow table, the network device may obtain a same-side IP address set and a peer-side IP address set of the port according to the flow table. The network device determines an intersection between the same-side IP address set and the peer-side IP address set of the port, to obtain a plurality of IP addresses. The network device determines, according to the flow table, a total flow quantity of data flows that correspond to the plurality of IP addresses and that are in all data flows passing through the port, and uses the determined total flow quantity as a first total flow quantity. If the first total flow quantity is greater than a first threshold, the network device determines a total flow quantity of all data flows passing through the port, and uses the determined total flow quantity as a second total flow quantity. If a ratio of the first total flow quantity to the second total flow quantity is greater than a second threshold, the network device determines that the port is a port with a loop. Then, ports with loops in the flow table may form the loop port set.

An implementation in which the network device determines, according to the flow table, the total flow quantity of all data flows passing through the port, and determines, according to the flow table, the total flow quantity of data flows that correspond to the plurality of IP addresses and that are in all data flows passing through the port may be: selecting a flow entry at which the port is located from the flow table, collecting statistics on a quantity of selected flow entries, and determining the quantity of selected flow entries as the total flow quantity of all data flows passing through the port; and then collecting statistics on a quantity of flow entries that are in the selected flow entries and whose source IP address or destination IP address is any one of the plurality of IP addresses, and determining the quantity of flow entries as the total flow quantity of data flows that correspond to the plurality of IP addresses and that are in all data flows passing through the port.

For example, when the port is a source port, the network device selects a flow entry whose source port is the port from the flow table, collects statistics on a quantity of selected flow entries, and determines the quantity of selected flow entries as a total flow quantity of all data flows passing through the port. Then, the network device collects statistics on a quantity of flow entries that are in the selected flow entries and whose source IP address or destination IP address is any one of the plurality of IP addresses, and determines the quantity of flow entries as a total flow quantity of data flows that correspond to the plurality of IP addresses and that are in all data flows passing through the port.

The same-side IP address set of the port is a set of IP addresses on a same side as the port, and the peer-side IP address set of the port is a set of IP addresses on different sides from the port. For example, the port is a source port. A same-side IP address set of the port is a set of source-end IP addresses, and a peer-side IP address set of the port is a set of destination-end IP addresses. Similarly, it is assumed that the port is a destination port. A same-side IP address set of the port is a set of destination-end IP addresses, and a peer-side IP address set of the port is a set of source-end IP addresses.

The first threshold and the second threshold may be set based on a requirement. For example, the first threshold may be 20, and the second threshold may be 0.2.

Usually, the plurality of IP addresses determined by using the intersection between the same-side IP address set and the peer-side IP address set of the port are IP addresses of both the source-end device and the destination-end device. In this case, the port may be considered as a potential port with a loop. To further verify whether the port is a port with a loop, the first total flow quantity may be determined. If the first total flow quantity is greater than the first threshold, the second total flow quantity and the ratio of the first total flow quantity to the second total flow quantity may further be determined. If the ratio is greater than the second threshold, it may indicate that the source-end IP addresses and the destination-end IP addresses of most data flows passing through the port are the same, that is, the source-end devices and the destination-end devices of most data flows passing through the port are same devices, and the port may further be determined as a port with a loop.

For example, for the destination port Port001 in Table 3, there are 100 flow entries in Table 3 whose destination ports are Port001, in which 30 flow entries have same destination IP addresses and source IP addresses. Then, it is determined that the first total flow quantity is 30, and the second total flow quantity is 100. It is assumed that the network device sets the first threshold to 20 and the second threshold to 0.2 based on a requirement. In this case, it may be determined that the first total flow quantity 30 is greater than the first threshold 20. Therefore, the ratio of the first total flow quantity to the second total flow quantity further needs to be determined. The ratio is 0.3 and the ratio is greater than the second threshold 0.2. Therefore, the port Port001 is determined as a port with a loop. Similarly, for the source port Port02 in Table 3, there are 150 flow entries in Table 3 whose source ports are Port02, in which 50 flow entries have same source IP addresses and destination IP addresses. Then, it is determined that the first total flow quantity is 50, and the second total flow quantity is 150. In this case, it may be determined that the first total flow quantity 50 is greater than the first threshold 20. Therefore, the ratio of the first total flow quantity to the second total flow quantity further needs to be determined. The ratio is 0.3 and the ratio is greater than the second threshold 0.2. Therefore, the port Port02 is determined as a port with a loop.

Further, if the first total flow quantity is not greater than the first threshold, or the ratio of the first total flow quantity to the second total flow quantity is not greater than the second threshold, it may be determined that the port is not a port with a loop.

(2) Determine a single-client access service set and a first multi-client access service set based on the loop port set and according to the flow table. Each service in the single-client access service set is accessed by a single client, an IP address and a port of the service belong to a same side, and the port does not belong to the loop port set. Each service in the first multi-client access service set is accessed by a plurality of clients, an IP address and a port of the service belong to a same side, and the port does not belong to the loop port set.

In some embodiments, the network device may determine, according to the flow table, a service that is accessed by a single client and whose IP address and port belong to a same side, and a service that is accessed by a plurality of clients and whose IP address and port belong to a same side, to obtain a potential single-client access service set and a first potential multi-client access service set. The network device selects, from the potential single-client access service set, a service at which a port in the loop port set is located, to obtain the single-client access service set. The network device selects, from the first potential multi-client access service set, a service at which a port in the loop port set is located, to obtain the first multi-client access service set.

An implementation in which the network device determines, according to the flow table, the service that is accessed by a single client and whose IP address and port belong to the same side, and the service that is accessed by a plurality of clients and whose IP address and port belong to the same side may be: determining a plurality of target services according to the flow table, where each target service corresponds to an IP address and a port in one flow entry that belong to a same side, and each target service corresponds to a plurality of data flows; determining, for each of the plurality of target services, whether a port of the target service is randomly generated; if the port of the target service is randomly generated, determining whether a quantity of same-side ports corresponding to the IP address of the target service is greater than a third threshold; if the quantity of same-side ports corresponding to the IP address of the target service is greater than the third threshold, determining whether a quantity of peer-side ports corresponding to the target service is greater than a fourth threshold; and if the quantity of peer-side ports corresponding to the target service is greater than the fourth threshold, determining that the target service is the service that is accessed by a plurality of clients and whose IP address and port belong to the same side; or if the quantity of peer-side ports corresponding to the target service is not greater than the fourth threshold, determining whether a peer-side IP address of the target service is unique; and if the peer-side IP address of the target service is unique, determining that the target service is the service that is accessed by a single client and whose IP address and port belong to the same side.

The target service corresponds to an IP address and a port in one flow entry that belong to a same side, and the target service corresponds to the plurality of data flows. In other words, in the flow table, if the plurality of data flows correspond to an IP address and a port in one flow entry that belong to the same side, the IP address and the port may be used as the target service. For example, if the plurality of data flows in the flow table correspond to a destination IP address and a destination port in one flow entry, the destination IP address and the destination port may be determined as the target service. Similarly, if the plurality of data flows in the flow table correspond to a source IP address and a source port in one flow entry, the source IP address and the source port may be determined as the target service.

In some embodiments, an implementation in which the network device determines whether the target service corresponds to the plurality of data flows may be: determining a quantity of flow entries in the flow table in which the target service is located; and if the determined quantity of flow entries is greater than a fifth threshold, determining that the target service corresponds to the plurality of data flows; or if the determined quantity of flow entries is not greater than a fifth threshold, determining that the target service does not correspond to the plurality of data flows.

The third threshold, the fourth threshold, and the fifth threshold may be set based on a requirement. For example, the third threshold may be 20, the fourth threshold may be 5, and the fifth threshold may be 10.

The target service corresponds to an IP address and a port in one flow entry that belong to a same side, and the target service corresponds to the plurality of data flows, that is, the IP address and the port of the target service may be an IP address and a port of the server. In other words, the target service may be the service that is accessed by a plurality of clients and whose IP address and port belong to the same side. Therefore, in this case, to further determine whether the target service is the service that is accessed by a plurality of clients and whose IP address and port belong to the same side, whether the port of the target service is randomly generated may further be determined. In some embodiments, an implementation of determining whether the port of the target service is randomly generated may be: determining whether a port number of the port of the target service is greater than 1024; and if the port number of the port of the target service is less than 1024, determining that the port is a well-known port, that is, the port is not randomly generated. If the port number of the port of the target service is greater than 1024, it is determined that the port is randomly generated.

If the port of the target service is randomly generated, whether the target service is the service that is accessed by a plurality of clients and whose IP address and port belong to the same side cannot be determined, and whether the quantity of same-side ports corresponding to the IP address of the target service is greater than the third threshold further needs to be determined. When determining whether the quantity of same-side ports corresponding to the IP address of the target service is greater than the third threshold, the network device needs to first determine the quantity of same-side ports corresponding to the IP address of the target service. In some embodiments, an implementation of determining the quantity of same-side ports corresponding to the IP address of the target service may be: selecting a flow entry in which the IP address of the target service is located from the flow table; determining the quantity of same-side ports that correspond to the IP address of the target service and that are in selected flow entries; and using the determined quantity of ports as the quantity of same-side ports corresponding to the IP address of the target service.

For example, based on the foregoing description, the target service may include a source IP address and a source port, or may include a destination IP address and a destination port. When the target service includes a source IP address and a source port, an implementation of determining the quantity of same-side ports corresponding to the IP address of the target service may be: selecting a flow entry in which the IP address of the target service is located from the flow table; determining a quantity of source ports in selected flow entries; and using the determined quantity of source ports as the quantity of same-side ports corresponding to the IP address of the target service. When the target service includes a destination IP address and a destination port, an implementation of determining the quantity of same-side ports corresponding to the IP address of the target service may be: selecting a flow entry in which the IP address of the target service is located from the flow table; determining a quantity of destination ports in selected flow entries; and using the determined quantity of destination ports as the quantity of same-side ports corresponding to the IP address of the target service.

A quantity of ports of the server is usually small, but a quantity of clients accessing the server is relatively large. Therefore, when determining that the quantity of same-side ports corresponding to the IP address of the target service is greater than the third threshold, the network device may further determine whether the quantity of peer-side ports corresponding to the target service is greater than the fourth threshold. When determining whether the quantity of peer-side ports corresponding to the target service is greater than the fourth threshold, the network device needs to first determine the quantity of peer-side ports corresponding to the target service. In some embodiments, an implementation of determining the quantity of peer-side ports corresponding to the target service may be: selecting a flow entry in which the target service is located from the flow table; determining a quantity of IP addresses that are in selected flow entries and that belong to different sides as the target service; and using the determined quantity of IP addresses as the quantity of peer-side ports corresponding to the target service.

For example, when the target service includes a source IP address and a source port, an implementation of determining the quantity of peer-side ports corresponding to the target service may be: selecting a flow entry in which the target service is located from the flow table; determining a quantity of destination IP addresses in selected flow entries; and using the determined quantity of destination IP addresses as the quantity of peer-side ports corresponding to the target service. When the target service includes a destination IP address and a destination port, an implementation of determining the quantity of peer-side ports corresponding to the target service may be: selecting a flow entry in which the target service is located from the flow table; determining a quantity of source IP addresses in selected flow entries; and using the determined quantity of source IP addresses as the quantity of peer-side ports corresponding to the target service.

When determining that the quantity of peer-side ports corresponding to the target service is greater than the fourth threshold, the network device determines that the target service is the service that is accessed by a plurality of clients and whose IP address and port belong to the same side. Based on the foregoing implementations, the service that is accessed by a plurality of clients and whose IP address and port belong to the same side can be accurately determined. When it is determined that the quantity of peer-side ports corresponding to the target service is not greater than the fourth threshold, it indicates that the target service may be accessed by a single client, and the IP address and the port of the target service may be the IP address and the port of the server. In this case, whether the peer-side IP address of the target service is unique may be determined. If the peer-side IP address of the target service is unique, it may be directly determined that the target service is the service that is accessed by a single client and whose IP address and port belong to the same side.

For example, a target service including a destination IP address and a destination port is IP001+Port001. It is assumed that the destination port Port001 is not randomly generated. Then, a quantity of destination ports corresponding to the IP address IP001 may be determined. It is assumed that the quantity of destination ports corresponding to the IP address IP001 is 25, and the third threshold set by the network device is 20. Because the quantity of destination ports corresponding to the IP address IP001 is greater than 20, a quantity of source ports corresponding to the target service may further be determined. It is assumed that the target service IP001+Port001 has 10 flow entries whose source IP addresses and source ports are not exactly the same in the flow table, and the fourth threshold set by the network device is 5. In this case, it may be determined that the quantity of source ports corresponding to the target service is 10 and is greater than 5. Therefore, it is determined that the target service IP001+Port001 is accessed by a plurality of clients and whose IP address and port belong to the same side.

If the target service IP001+Port001 has 3 flow entries whose source IP addresses and source ports are not exactly the same in the flow table, it may be determined that the quantity of source ports corresponding to the target service is 3 and is less than 5. Then, it is determined whether the source IP addresses of the 3 flow entries are the same. If the source IP addresses of the 3 flow entries are the same, and the source ports are different, it is determined that the target service IP001+Port001 is accessed by a single client and whose IP address and port belong to the same side.

Further, well-known ports are ports reserved by the server. Therefore, if the port of the target service is not randomly generated, that is, the port of the target service is a well-known port, it may be directly determined that the target service is the service that is accessed by a plurality of clients and whose IP address and port belong to the same side.

Further, if the quantity of same-side ports corresponding to the IP address of the target service is not greater than the third threshold, it is determined that the target service is the service that is accessed by a plurality of clients and whose IP address and port belong to the same side. Alternatively, if the peer-side IP address of the target service is not unique, it is determined that the target service is neither the service that is accessed by a single client and whose IP address and port belong to the same side, nor the service that is accessed by a plurality of clients and whose IP address and port belong to the same side.

(3) Determine a second multi-client access service set based on the loop port set and the first multi-client access service set and according to the flow table.

In some embodiments, the network device may determine, based on the first multi-client access service set and according to the flow table, a service that is accessed by a plurality of clients and whose IP address and port belong to different sides, to obtain a second potential multi-client access service set; and selecting, from the second potential multi-client access service set, a service at which a port in the loop port set is located, to obtain the second multi-client access service set.

An implementation in which the network device may determine, based on the first multi-client access service set and according to the flow table, the service that is accessed by a plurality of clients and whose IP address and port belong to different sides may be: determining an IP address and a port that are in a same flow entry in the flow table and that belong to different sides as one reference service, to obtain a plurality of reference services; determining, for each of the plurality of reference services, whether the reference service corresponds to a plurality of data flows; if the reference service corresponds to the plurality of data flows, determining whether a port of the reference service is randomly generated; if the port of the reference service is not randomly generated, determining whether the port of the reference service is included in the first multi-client access service set; if the port of the reference service is not included in the first multi-client access service set, determining whether an IP address of the reference service is included in the source IP addresses in the domain name table; and if the IP address of the reference service is not included in the source IP addresses in the domain name table, determining that the reference service is the service that is accessed by a plurality of clients and whose IP address and port belong to different sides.

The reference service also includes an IP address and a port. Different from the target service, the IP address and the port of the reference service belong to different sides. For example, a destination IP address and a source port in a same flow entry may form a reference service. Alternatively, a source IP address and a destination port in a same flow entry may form a reference service.

In some embodiments, an implementation in which the network device determines whether the reference service corresponds to the plurality of data flows may be: determining a quantity of flow entries in the flow table in which the reference service is located; and if the determined quantity of flow entries is greater than a fifth threshold, determining that the reference service corresponds to the plurality of data flows; or if the determined quantity of flow entries is not greater than a fifth threshold, determining that the reference service does not correspond to the plurality of data flows.

For an operation of determining, by the network device, whether the port of the reference service is randomly generated, refer to the foregoing operation of determining whether the port of the target service is randomly generated. Details are not described in this embodiment of this application.

In some cases, in the flow table obtained through feature extraction, the source IP address and the destination IP address may be reversed. Consequently, the source IP address included in the reference service may be incorrectly used as a destination IP address, or the destination IP address is incorrectly used as a source IP address. In this case, it cannot be determined whether the IP address and port of the reference service are an IP address and a port that are in a same flow entry and that belong to different sides. However, the source IP addresses in the domain name table are the correct source IP addresses. Therefore, if it is determined that the IP address of the reference service is not included in the source IP addresses in the domain name table, the reference service is determined as the service that is accessed by a plurality of clients and whose IP address and port belong to different sides.

Further, if the reference service does not correspond to the plurality of data flows, the port of the reference service is randomly generated, the port of the reference service is included in the first multi-client access service set, or the IP address of the reference service is included in the source IP addresses in the domain name table, it may be determined that the reference service is not the service that is accessed by a plurality of clients and whose IP address and port belong to different sides.

(4) Combine the first multi-client access service set, the second multi-client access service set, and the single-client access service set, to obtain the plurality of services.

Because each of the first multi-client access service set, the second multi-client access service set, and the single-client access service set includes one or more services, the plurality of services belonging to the server can be obtained after the first multi-client access service set, the second multi-client access service set, and the single-client access service set are combined.

Step 303: The network device clusters the plurality of services according to the flow table and the domain name table, to obtain a plurality of application types.

In some embodiments, step 303 may be implemented by using the following steps (1) to (6).

(1) Perform time-correlated clustering on the plurality of services according to the flow table and the domain name table, to obtain a time-correlated clustering result.

In some embodiments, the network device may obtain, according to the flow table, a flow start time point in a flow entry in which each of the plurality of services is located. The network device determines a time difference between every two services in the plurality of services based on the obtained flow start time point. The network device determines time correlation between every two services in the plurality of services based on the determined time difference. The network device selects, from the plurality of services based on the time correlation between every two services in the plurality of services, a service that meets a time correlation condition. The network device generates a similarity matrix based on the time correlation between the selected services. The network device determines a spectral clustering result of the plurality of services through spectral cluster analysis based on the similarity matrix. The network device determines a similarity between every two services in the plurality of services according to the domain name table. The network device determines the time-correlated clustering result based on the similarity between every two services in the plurality of services and the spectral clustering result.

An implementation in which the network device determines the time correlation between every two services in the plurality of services based on the determined time difference may be: for any two services in the plurality of services, determining whether the time difference between the two services is less than a second time threshold; and if the time difference between the two services is less than the second time threshold, determining that the two services are time-correlated; or if the time difference between the two services is not less than the second time threshold, determining that the two services are not time-correlated. For any two other services, whether the two services are time-correlated may also be determined according to the foregoing method.

The second time threshold may be set based on a requirement. This is not limited in this embodiment of this application.

In some embodiments, an implementation in which the network device selects, from the plurality of services based on the time correlation between every two services in the plurality of services, the service that meets the condition may be: generating an undirected graph based on the time correlation between every two services in the plurality of services, where the undirected graph includes a plurality of nodes that are in a one-to-one correspondence with the plurality of services and edges corresponding to two services that are time-correlated, and the edge is used to connect two nodes corresponding to two services that are time-correlated; determining a maximal clique in the undirected graph, where the maximal clique is a connected region including a largest quantity of nodes after nodes are connected by using edges; and determining a service corresponding to a node in the maximal clique as the service that meets the time correlation condition.

Figure 4:
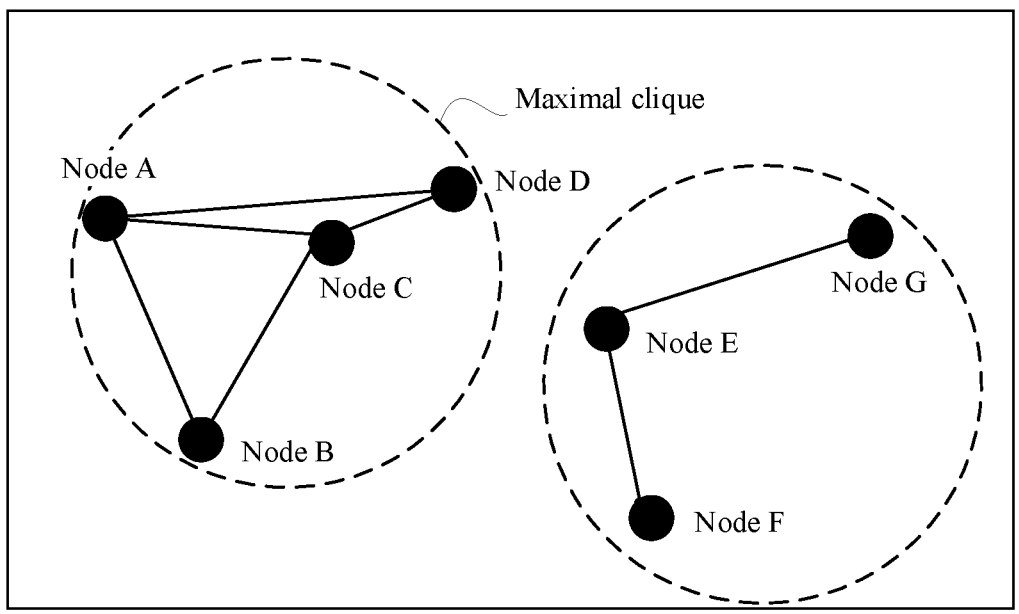
FIG. 4 is a diagram of an undirected graph according to an embodiment of this application.

FIG. 4 is a diagram of an undirected graph according to an embodiment of this application. For example, the plurality of services are a service A to a service G. The service A is time-correlated with the service B, the service B is time-correlated with the service C, the service C is separately time-correlated with the service A and the service D, the service D is time-correlated with the service A, the service E is time-correlated with the service F, and the service E is time-correlated with the service G. Then, the undirected graph shown in FIG. 4 may be generated. In the undirected graph, a node A corresponding to the service A is connected to a node B corresponding to the service B to form an edge, the node B corresponding to the service B is connected to a node C corresponding to the service C to form an edge, the node C corresponding to the service C is separately connected to the node A corresponding to the service A and to a node D corresponding to the service D to form two edges, the node D corresponding to the service D is connected to the node A corresponding to the service A to form an edge, a node E corresponding to the service E is connected to a node F corresponding to the service F to form an edge, and the node E corresponding to the service E is connected to a node G corresponding to the service G to form an edge. In the undirected graph, the connected region including a largest quantity of nodes after nodes are connected by using edges is a connected region including the node A, the node B, the node C, and the node D. The connected region is the maximal clique in the foregoing undirected graph. In this case, the service A, the service B, the service C, and the service D are determined as services that meet the time correlation condition.

In some embodiments, an implementation in which the network device generates the similarity matrix based on the time correlation between the selected services may be: for every two selected services, if the two services are time-correlated, determining that an element corresponding to the two services in the similarity matrix is 1; or if the two services are not time-correlated, determining that an element corresponding to the two services in the similarity matrix is 0. An element corresponding to a same service in the similarity matrix is 1.

In some other embodiments, based on the foregoing maximal clique, an implementation in which the network device generates the similarity matrix based on the time correlation between the selected services may be: for every two selected services, if nodes corresponding to the two services in the maximal clique are connected to form an edge, determining that an element corresponding to the two services in the similarity matrix is 1; or if nodes corresponding to the two services in the maximal clique are not connected to form an edge, determining that an element corresponding to the two services in the similarity matrix is 0.

For example, if the service A is time-correlated with the service B, an element corresponding to the service A and the service B in the similarity matrix is 1. If the service B is time-correlated with the service C, an element corresponding to the service B and the service C in the similarity matrix is 1. If the service C is time-correlated with the service A, an element corresponding to the service C and the service A in the similarity matrix is 1. If the service C is time-correlated with the service D, an element corresponding to the service C and the service D in the similarity matrix is 1. In this case, a similarity matrix generated based on the time correlation between the service A, the service B, the service C, and the service D is:

$$\begin{bmatrix} L_{AA} & L_{AB} & L_{AC} & L_{AD} \\ L_{BA} & L_{BB} & L_{BC} & L_{BD} \\ L_{CA} & L_{CB} & L_{CC} & L_{CD} \\ L_{DA} & L_{DB} & L_{DC} & L_{DD} \end{bmatrix} = \begin{bmatrix} 1 & 1 & 1 & 0 \\ 1 & 1 & 1 & 0 \\ 1 & 1 & 1 & 1 \\ 0 & 0 & 1 & 1 \end{bmatrix}$$

The foregoing similarity matrix is a matrix of n rows and n columns, that is, n services are selected from the plurality of services based on the time correlation between every two services in the plurality of services. The foregoing spectral cluster analysis is clustering the n services based on the similarity matrix. The spectral cluster analysis may be used to determine which services in the n services can be clustered into one type. For an implementation of spectral cluster analysis, refer to a related technology.

In some embodiments, an implementation in which the network device determines the similarity between every two services in the plurality of services according to the domain name table may be: determining, according to the domain name table, a domain name corresponding to an IP address of each of the plurality of services; and determining the similarity between domain names corresponding to IP addresses of every two services in the plurality of services, to obtain the similarity between every two services in the plurality of services.

For any two services in the plurality of services, an implementation of determining the similarity between domain names corresponding to IP addresses of the two services may be: determining, according to the domain name table, the domain names corresponding to the IP addresses of the two services; performing word segmentation on the domain name corresponding to the IP address of each service, to obtain all words in the domain name corresponding to each IP address; removing a word used as a domain name suffix from all words in the domain name corresponding to each IP address, to obtain a word group of the domain name corresponding to each IP address; and determining intersection over union of word groups of the domain names corresponding to the IP addresses of the two services, and determining the similarity between the domain names corresponding to the IP addresses of the two services based on the determined intersection over union.

Domain name suffixes of most domain names may be the same. Therefore, a similarity between words without the domain name suffixes can accurately reflect the similarity between the two domain names.

The intersection over union of every two word groups is a ratio of a quantity of intersection elements to a quantity of union elements in the two word groups. For example, a domain name corresponding to an IP address of a service 1 is abnd-jap.xxx.com, and a word group of the domain name may include abnd, jap, and xxx. A domain name corresponding to an IP address of a service 2 is abnd-hx.xxx.com, and a word group of the domain name may include abnd, hk, and xxx. In the two word groups, intersection elements are abnd and xxx, and union elements are abnd, jap, hk, and xxx. A quantity of intersection elements in the two word groups is 2, and a quantity of union elements in the two word groups is 4. Therefore, intersection over union of the word groups of domain names corresponding to IP addresses of the two services is 2/4.

Because spectral cluster analysis comprises dividing a plurality of relatively similar services into one type, a spectral clustering result may include a plurality of types of services, and each type of services includes a plurality of relatively similar services. In other words, the spectral clustering result may include a plurality of first service sets, and each first service set includes a plurality of relatively similar services. However, after the spectral cluster analysis, two service sets may include more similar services, and spectral cluster analysis may not be performed on some services. Therefore, the network device determines the time-correlated clustering result based on the similarity between every two services in the plurality of services and the spectral clustering result. In some embodiments, an implementation in which the network device determines the time-correlated clustering result based on the similarity between every two services in the plurality of services and the spectral clustering result may be: for each service in each of the plurality of first service sets included in the spectral clustering result, determining a similarity between the service and another service in the same first service set as the service based on the similarity between every two services in the plurality of services; and if the similarity between the service and another service in the same first service set as the service is not greater than a similarity threshold, removing the service from the first service set. After the foregoing processing manner is performed on each service in each first service set included in the spectral clustering result, a plurality of second service sets may be obtained. For each removed service, a similarity between the service and each service in each second service set may be determined based on the similarity between every two services in the plurality of services. If the similarity between the service and each service in one of the second service sets is greater than the similarity threshold, the service is added to the second service set. Services on which spectral cluster analysis is not performed are clustered by using the foregoing processing manner performed on a removed service, to obtain the time-correlated clustering result.

The similarity threshold may be set based on a requirement. This is not limited in this embodiment of this application.

Optionally, in this embodiment of this application, before performing time-correlated clustering on the plurality of services according to the flow table and the domain name table, the network device may further process the flow table again based on the plurality of services determined in step 302. In some embodiments, a flow entry whose destination IP address and destination port are not an IP address and a port of any one of the plurality of services in the flow table may be deleted, and/or an entry whose source IP address and destination IP address are reversed may be corrected, and an entry whose source port and destination port are reversed may be corrected.

(2) Select a periodic service from the plurality of services according to the flow table, to obtain a periodic clustering result.

In some embodiments, for each of the plurality of services, the network device obtains, according to the flow table, a flow start time point of the plurality of data flows of the service accessed by a same client. The network device determines a time difference between every two adjacent flow start time points based on a sequence of the flow start time points of the plurality of data flows of the accessed service. The network device determines whether a periodicity of the service is a strong periodicity through a Fourier transform based on the determined time difference. If the periodicity of the service is a strong periodicity, the network device determines that the service is a periodic service.

In some embodiments, an implementation in which the network device obtains, according to the flow table, the flow start time point of the plurality of data flows of the service accessed by the same client may be: selecting a flow entry whose destination IP address and destination port are an IP address and a port of the service from the flow table; determining a quantity of flow entries in which a source IP address of the selected flow entry is located; obtaining a flow start time point from a flow entry in which the source IP address, corresponding to a largest quantity of flow entries, is located; and determining the obtained flow start time point as the flow start time point of the plurality of data flows of the service accessed by the same client.

For example, for a service IP008+Port008, in the flow table, there are 20 flow entries whose destination IP address and destination port are an IP address and a port of the service. In the 20 flow entries, if a quantity of flow entries in which a source IP address IP08 is located is 15, and a quantity of flow entries whose source IP address is IP01 is 5, a flow start time point in the flow entry in which the source IP address IP08 is located may be obtained, and the obtained flow start time point is determined as the flow start time point of the plurality of data flows of the service accessed by the same client.

In some embodiments, an implementation of determining whether the periodicity of the service is a strong periodicity through a Fourier transform based on the determined time difference may be: establishing a coordinate system by using a quantity of determined time differences as a horizontal axis and by using the determined time differences as a vertical axis; drawing the determined time differences into the coordinate system, to obtain discrete signals; performing a Fourier transform on the discrete signals, to determine whether a quantity of peak values in transformed signals is less than a sixth threshold; and if the quantity of peak values is less than the sixth threshold, determining that the periodicity of the service is a strong periodicity; or if the quantity of peak values is not less than the sixth threshold, determining that the periodicity of the service is not strongly periodic.

The sixth threshold may be set based on a requirement. This is not limited in this embodiment of this application.

(3) Obtain a plurality of first services and a plurality of second services from the plurality of services according to the domain name table. The plurality of first services are services that are accessed by a plurality of clients and that correspond to domain names, and the plurality of second services include a service that is accessed by a plurality of clients and that does not correspond to domain names and a service that is accessed by a single client.

It can be learned from step (4) in step 302 that the plurality of services include a service accessed by a plurality of clients and a service accessed by a single client, and each domain name entry in the domain name table includes the source IP address, the destination domain name, the destination IP address, and the domain name type. Therefore, for the services accessed by a plurality of clients, whether each of the plurality of services corresponds to a domain name may be determined from the domain name table, and then a service that is accessed by a plurality of clients and corresponds to a domain name is selected from the plurality of services, to obtain the plurality of first services. In addition, the service that is accessed by a plurality of clients and does not correspond to a domain name can be selected.

(4) Perform semantic-correlated clustering on the plurality of first services, to obtain a semantic-correlated clustering result.

In some embodiments, the network device may cluster the plurality of first services based on domain name semantic correlation, to obtain a plurality of first clustering results. The network device combines the plurality of first clustering results based on domain name similarity between the plurality of first clustering results, to obtain a plurality of second clustering results. The network device clusters an unclustered service and the plurality of second clustering results based on domain name semantic correlation between the unclustered service in the plurality of first services and each second clustering result, to obtain the semantic-correlated clustering result.

An implementation of clustering the plurality of first services based on the domain name semantic correlation may be: obtaining, from the plurality of first services, a plurality of third services that are accessed by a plurality of clients and correspond to a unique domain name, and obtaining, from the plurality of first services, a plurality of fourth services that are accessed by a plurality of clients and correspond to a plurality of domain names; obtaining combinable domain names from the domain names corresponding to the plurality of fourth services, and combining the combinable domain names to obtain a plurality of first domain names; removing a number and a symbol from each first domain name, and removing a number and a symbol from the domain name corresponding to each third service, to obtain a plurality of second domain names; clustering services corresponding to the plurality of second domain names based on semantic correlation of the plurality of second domain names; and clustering services corresponding to domain names that are not combinable based on semantic correlation of the domain names that are not combinable in the domain names corresponding to the plurality of fourth services.

Because the plurality of first services are services accessed by a plurality of clients, for each first service, a domain name corresponding to the first service may be determined from the domain name table. If the domain name corresponding to the first service is unique, the first service is determined as a third service that is accessed by a plurality of clients and that corresponds to a unique domain name. If the domain name corresponding to the first service is not unique, the first service is determined as a fourth service that is accessed by a plurality of clients and that corresponds to a plurality of domain names.

In some embodiments, an implementation of obtaining the combinable domain names from the domain names corresponding to the plurality of fourth services, and combining the combinable domain names to obtain the plurality of first domain names may be: obtaining a plurality of domain names with a same level-1 domain name from the domain names corresponding to the plurality of fourth services; performing word segmentation on the obtained plurality of domain names to obtain all words in each domain name; removing a word belonging to the level-1 domain name from all words in each domain name to obtain a word group of each domain name; determining intersection over union of obtained word groups of the plurality of domain names and if the intersection over union is greater than a first intersection over union threshold, determining that in the domain names corresponding to the plurality of fourth services, the plurality of domain names with the same level-1 domain name are combinable domain names; determining an intersection of the obtained word groups of the plurality of domain names; and adding the intersection of the plurality of word groups in front of the level-1 domain name to obtain a combined domain name, namely, the first domain name.

For example, the domain names corresponding to the plurality of fourth services are abpd-jap.xxx.com, acnd-jap.xxx.com, and abed-jap.xxx.com. Word segmentation is performed on the three domain names, to obtain words abpd, jap, xxx, and com in the domain name abpd-jap.xxx.com, words acnd, jap, xxx, and com in the domain name acnd-jap.xxx.com, and words abed, jap, xxx, and com in the domain name abed-jap.xxx.com. Words xxx and com that belong to the level-1 domain name are removed from all words in each domain name, to obtain a word group {abpd, jap} of the domain name abpd-jap.xxx.com, a word group {acnd, jap} of the domain name acnd-jap.xxx.com, and a word group {abed, jap} of the domain name abed-jap.xxx.com. An intersection element in the three word groups is jap, and a quantity of intersection elements is 1. Union elements are abpd, acnd, abed, and jap, and a quantity of union elements is 4. In this case, intersection over union of the three word groups may be determined to be 1/4. It is assumed that the intersection over union is greater than the first intersection over union threshold. It is determined that the three domain names are combinable domain names. Then, an intersection of the obtained word groups of the plurality of domain names is determined. The intersection of the plurality of word groups is added in front of the level-1 domain name, to obtain a combined domain name, that is, the first domain name is jap.xxx.com.

The semantic correlation of the plurality of second domain names may also be determined based on intersection over union of corresponding word groups, and second domain names whose intersection over union is greater than a second intersection over union threshold are further divided into one type, to implement clustering of the services corresponding to the plurality of second domain names. For a manner of determining the intersection over union of the word groups corresponding to the plurality of second domain names, refer to the foregoing manner. Details are not described in this embodiment of this application.

The semantic correlation of the domain names that are not combinable in the domain names corresponding to the plurality of fourth services may also be determined based on intersection over union of corresponding word groups. Then, domain names that are not combinable and whose intersection over union is greater than a third intersection over union threshold are further divided into one type, to implement clustering of the services corresponding to the domain names that are not combinable. For a manner of determining the intersection over union of the word groups corresponding to the domain names that are not combinable in the domain names corresponding to the plurality of fourth services, refer to the foregoing manner. Details are not described in this embodiment of this application.

The first intersection over union threshold, the second intersection over union threshold, and the third intersection over union threshold may be set based on a requirement, and the first intersection over union threshold, the second intersection over union threshold, and the third intersection over union threshold may be the same, or may be different.

(5) Perform client-similarity clustering on the plurality of second services, to obtain a client-similarity clustering result.

In some embodiments, the network device may determine an IP address of a client accessing each of the plurality of second services; and cluster the plurality of second services based on intersection over union of the IP addresses of the clients accessing each second service, to obtain the client-similarity clustering result.

For example, the network device may divide the second services whose intersection over union of the IP addresses of the clients of the second services is greater than a fourth intersection over union threshold into one type, to obtain the client-similarity clustering result.

For example, a client of a second service A has three IP addresses: IP01, IP02, and IP03, and a client of a second service B also has three IP addresses: IP01, IP03, and IP05. Two IP addresses of the client of the second service A are the same as two IP addresses of the client of the second service B. Therefore, intersection elements between the IP addresses of the client of the second service A and the IP addresses of the client of the second service B are {IP01, IP03}, union elements between the IP addresses of the client of the second service A and the IP addresses of the client of the second service B are {IP01, IP02, IP03, IP05}, and intersection over union between the IP addresses of the client of the second service A and the IP addresses of the client of the second service B is 2/4. It is assumed that the intersection over union between the IP addresses of the client of the second service A and the IP addresses of the client of the second service B is greater than the fourth intersection over union threshold. The two services are clustered, to obtain a client-similarity clustering result.

(6) Merge the time-correlated clustering result, the periodic clustering result, the semantic-correlated clustering result, and the client-similarity clustering result, to obtain the plurality of application types.

In some embodiments, the network device may determine intersection over union between every two clustering results, and combine two clustering results between which intersection over union is greater than a fifth intersection over union threshold. After all clustering results are processed by using the foregoing manner, the plurality of application types may be obtained. The intersection over union between every two clustering results is intersection over union of services in the two clustering results, that is, a ratio of a quantity of intersection services to a quantity of union services in the two clustering results.

Each clustering result includes a plurality of application types. Therefore, after the foregoing four clustering results are combined, the plurality of application types may be obtained, and each application type may correspond to a plurality of services.

In addition, the fourth intersection over union threshold and the fifth intersection over union threshold may be set based on a requirement, and the fourth intersection over union threshold and the fifth intersection over union threshold may be the same, or may be different. The fourth intersection over union threshold, the fifth intersection over union threshold, the first intersection over union threshold, the second intersection over union threshold, and the third intersection over union threshold may be the same, or may be different.

Step 304: The network device determines a label corresponding to each of the plurality of application types, where the label is used to identify an application to which a data flow belongs.

In some embodiments, the network device may divide the plurality of application types into a first application group, a second application group, and a third application group. A service included in each application type in the first application group corresponds to a domain name, a service included in each application type in the second application group does not correspond to a domain name, and each application type in the third application group corresponds to a service that is not clustered. The network device determines a label corresponding to each application type based on the domain name corresponding to the service included in each application type in the first application group, and determines a label corresponding to each application type in the second application group and a label corresponding to each application type in the third application group.

In some embodiments, an implementation in which the network device determines the label corresponding to each application type based on the domain name corresponding to the service included in each application type in the first application group may be: for each application type in the first application group, determining level-1 domain names in domain names corresponding to services included in the application type; and if all determined level-1 domain names are the same, determining an enterprise name corresponding to the level-1 domain name, and using the enterprise name as the label corresponding to the application type; or if the determined level-1 domain names are different, determining an enterprise name corresponding to a level-1 domain name with a largest proportion in the level-1 domain names, and using the enterprise name as the label corresponding to the application type.

For example, an application type in the first application group includes 20 services, and a level-1 domain name in a domain name corresponding to each service is xxx.com. It is assumed that an enterprise name corresponding to the level-1 domain name is xxx. Then, xxx is used as a label corresponding to the application type. For another example, an application type in the first application group includes 50 services, level-1 domain names in domain names corresponding to 40 services are xxx.com, and level-1 domain names in domain names corresponding to the other 10 services are scmd.com. It is assumed that an enterprise name corresponding to the level-1 domain name xxx.com is xxx, and an enterprise name corresponding to the level-1 domain name scmd.com is scmd. Because a proportion of the level-1 domain names xxx.com is the largest, xxx may be used as a label corresponding to the application type.

In some embodiments, an implementation in which the network device determines the label corresponding to each application type in the second application group may be: for each application type in the second application group, determining, based on the service included in the application type, a service at which the well-known port is located, a service belonging to the loop port set, a service whose source port and destination port are the same, and a service belonging to the second multi-client access service set; determining whether a quantity of services is greater than a seventh threshold; and if the quantity of services is not greater than the seventh threshold, generating the label corresponding to the application type based on a first target character and a first format; or if the quantity of services is greater than the seventh threshold, generating the label corresponding to the application type based on a first target character and a second format.

The first target character may be set based on a requirement. For example, the first target character is NN. The first format and the second format may also be set based on a requirement. For example, the first format may be: first target character/{IP01+Port001, IP02+Port002, IP01+Port003}, and the second format may be: first target character/{IP: 001, 002, 003, 004}.

For example, an application type in the second application group includes 30 services. It is determined based on the 30 services that services at which the well-known port is located are IP01+Port001 and IP02+Port002, the service belonging to the loop port set is IP12+Port002, the service whose source port and destination port are the same is IP14+Port011, and the service belonging to the second multi-client access service set is IP05+Port005. In this case, a quantity of services may be determined as 5. It is assumed that the quantity 5 of services is not greater than a seventh threshold, and the first target character is NN. It may be determined that the label corresponding to the application type is NN/{IP01+Port001, IP02+Port002, IP12+Port002, IP14+Port011, IP05+Port005}. It is assumed that the quantity 5 of services is greater than the seventh threshold. It may be determined that the label corresponding to the application type is NN/{IP: 001, 002, 002, 011, 005}.

In some embodiments, an implementation in which the network device determines the label corresponding to each application type in the third application group may be: for each application type in the third application group, determining whether a quantity of services included in the application type is greater than the seventh threshold; and if the quantity is not greater than the seventh threshold, generating the label corresponding to the application type based on a second target character and a first format; or if the quantity is greater than the seventh threshold, generating the label corresponding to the application type based on a second target character and a second format.

The second target character may be set based on a requirement. For example, the second target character is UKN. The first format and the second format may also be set based on a requirement. For example, the first format may be: second target character/{IP01+Port001, IP02+Port002, IP01+Port003}, and the second format may be: second target character/{IP: 001, 002, 003, 004}.

After determining the label corresponding to each of the plurality of application types, the network device may further display the label corresponding to each of the plurality of application types.

In this embodiment of this application, the network device may perform flow behavior feature analysis according to the flow table to obtain the plurality of services. Each service includes one IP address and one port identifier, and one application may usually include a group of services. Therefore, after the plurality of services are clustered according to the flow table and the domain name table, the plurality of application types may be obtained, where each application type includes a plurality of services and each application type corresponds to one application. In this case, a label corresponding to each of the plurality of application types may be determined. Therefore, the label may be used to identify an application to which a data flow belongs. It may be learned that in this embodiment of this application, an application may be identified based on a flow behavior feature without a traffic feature database. In this case, when a new application appears, the new application may be directly identified based on an IP address and a port of a server accessed by the new application. This improves an application identification rate.

Figure 5:
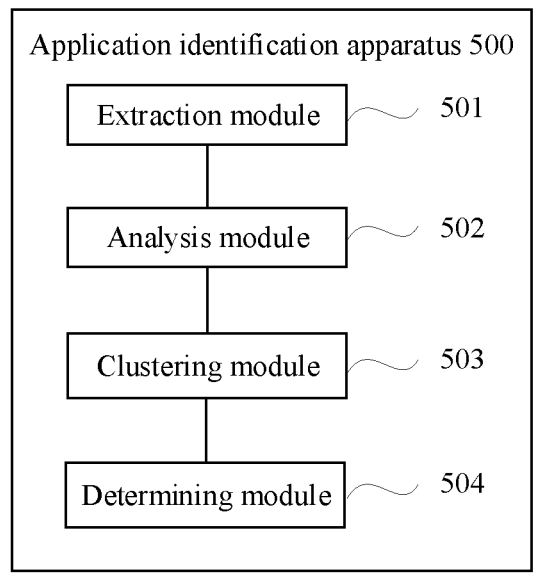
FIG. 5 is a diagram of an apparatus for application identification according to an embodiment of this application.

FIG. 5 is a diagram of an apparatus 500 for application identification according to an embodiment of this application. The apparatus 500 for application identification may be implemented as a part or the entire of a network device by using software, hardware, or a combination thereof. The apparatus 500 includes an extraction module 501, an analysis module 502, a clustering module 503, and a determining module 504. Functions of the extraction module 501, the analysis module 502, the clustering module 503, and the determining module 504 may be implemented by using the processor in the embodiment in FIG. 2.

The extraction module 501 is configured to perform an operation of step 301 in the embodiment in FIG. 3.

The analysis module 502 is configured to perform an operation of step 302 in the embodiment in FIG. 3.

The clustering module 503 is configured to perform an operation of step 303 in the embodiment in FIG. 3.

The determining module 504 is configured to perform an operation of step 304 in the embodiment in FIG. 3.

Figure 6:
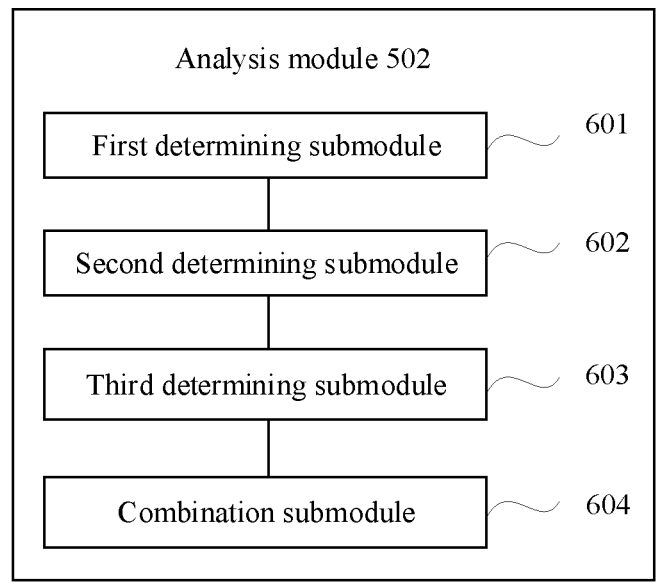
FIG. 6 is a diagram of an analysis module according to an embodiment of this application.

FIG. 6 is a diagram of the analysis module 502 of FIG. 5 according to an embodiment of this application. The analysis module 502 includes:

a first determining submodule 601, configured to determine a port with a loop according to a flow table, to obtain a loop port set;

a second determining submodule 602, configured to determine a single-client access service set and a first multi-client access service set based on the loop port set and according to the flow table, where each service in the single-client access service set is accessed by a single client, an IP address and a port of the service belong to a same side, the port does not belong to the loop port set, each service in the first multi-client access service set is accessed by a plurality of clients, an IP address and a port of the service belong to a same side, and the port does not belong to the loop port set;

a third determining submodule 603, configured to determine a second multi-client access service set based on the loop port set and the first multi-client access service set and according to the flow table, where each service in the second multi-client access service set is accessed by a plurality of clients, an IP address and a port of the service belong to different sides, and the port does not belong to the loop port set; and a combination submodule 604, configured to combine the first multi-client access service set, the second multi-client access service set, and the single-client access service set, to obtain a plurality of services.

Optionally, the first determining submodule 601 is configured to:

obtain, for each port in the flow table, a same-side IP address set and a peer-side IP address set of the port according to the flow table;

determine an intersection between the same-side IP address set and the peer-side IP address set of the port, to obtain a plurality of IP addresses;

determine, according to the flow table, a total flow quantity of data flows that correspond to the plurality of IP addresses and that are in all data flows passing through the port, and use the determined total flow quantity as a first total flow quantity;

if the first total flow quantity is greater than a first threshold, determine a total flow quantity of all data flows passing through the port, and use the determined total flow quantity as a second total flow quantity; and if a ratio of the first total flow quantity to the second total flow quantity is greater than a second threshold, determine that the port is a port with a loop.

Optionally, the second determining submodule 602 is configured to:

determine, according to the flow table, a service that is accessed by a single client and whose IP address and port belong to a same side, and a service that is accessed by a plurality of clients and whose IP address and port belong to a same side, to obtain a potential single-client access service set and a first potential multi-client access service set; and select, from the potential single-client access service set, a service at which a port in the loop port set is located, to obtain the single-client access service set and select, from the first potential multi-client access service set, a service at which a port in the loop port set is located, to obtain the first multi-client access service set.

Optionally, the second determining submodule 602 is further configured to:

determine a plurality of target services according to the flow table, where each target service corresponds to an IP address and a port in one flow entry that belong to a same side, and each target service corresponds to a plurality of data flows;

determine, for each of the plurality of target services, whether a port of the target service is randomly generated;

if the port of the target service is randomly generated, determine whether a quantity of same-side ports corresponding to the IP address of the target service is greater than a third threshold;

if the quantity of same-side ports corresponding to the IP address of the target service is greater than the third threshold, determine whether a quantity of peer-side ports corresponding to the target service is greater than a fourth threshold; and if the quantity of peer-side ports corresponding to the target service is greater than the fourth threshold, determine that the target service is the service that is accessed by a plurality of clients and whose IP address and port belong to the same side; or if the quantity of peer-side ports corresponding to the target service is not greater than the fourth threshold, determine whether a peer-side IP address of the target service is unique; and if the peer-side IP address of the target service is unique, determine that the target service is the service that is accessed by a single client and whose IP address and port belong to the same side.

Optionally, the second determining submodule 602 is further configured to:

if the port of the target service is not randomly generated, determine that the target service is the service that is accessed by a plurality of clients and whose IP address and port belong to the same side.

Optionally, the second determining submodule 602 is further configured to:

if the quantity of same-side ports corresponding to the IP address of the target service is not greater than the third threshold, determine that the target service is the service that is accessed by a plurality of clients and whose IP address and port belong to the same side.

Optionally, the third determining submodule 603 is configured to:

determine, based on the first multi-client access service set and according to the flow table, a service that is accessed by a plurality of clients and whose IP address and port belong to different sides, to obtain a second potential multi-client access service set; and select, from the second potential multi-client access service set, a service at which a port in the loop port set is located, to obtain the second multi-client access service set.

Optionally, the third determining submodule 603 is further configured to:

determine an IP address and a port that are in a same flow entry in the flow table and that belong to different sides as one reference service, to obtain a plurality of reference services;

determine, for each of the plurality of reference services, whether the reference service corresponds to a plurality of data flows;

if the reference service corresponds to the plurality of data flows, determine whether a port of the reference service is randomly generated;

if the port of the reference service is not randomly generated, determine whether the port of the reference service is included in the first multi-client access service set;

if the port of the reference service is not included in the first multi-client access service set, determine whether an IP address of the reference service is included in the source IP addresses in the domain name table; and if the IP address of the reference service is not included in the source IP addresses in the domain name table, determine that the reference service is the service that is accessed by a plurality of clients and whose IP address and port belong to different sides.

Figure 7:
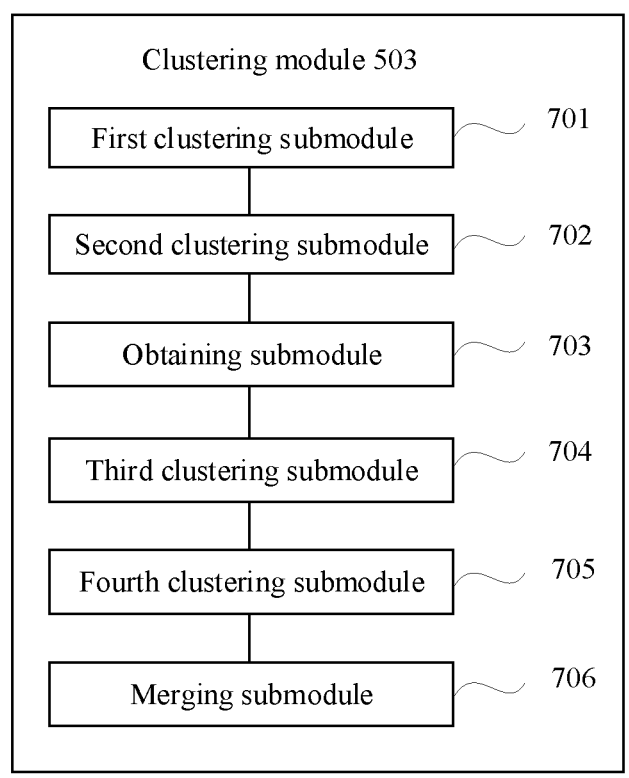
FIG. 7 is a diagram of a clustering module according to an embodiment of this application.

FIG. 7 is a diagram of the clustering module 503 of FIG. 5 according to an embodiment of this application. Optionally, the clustering module 503 includes:

a first clustering submodule 701, configured to perform time-correlated clustering on the plurality of services according to the flow table and the domain name table, to obtain a time-correlated clustering result;

a second clustering submodule 702, configured to select a periodic service from the plurality of services according to the flow table, to obtain a periodic clustering result;

an obtaining submodule 703, configured to obtain a plurality of first services and a plurality of second services from the plurality of services according to the domain name table, where the plurality of first services are services that are accessed by a plurality of clients and that correspond to domain names, and the plurality of second services include a service that is accessed by a plurality of clients and that does not correspond to domain names and a service that is accessed by a single client;

a third clustering submodule 704, configured to perform semantic-correlated clustering on the plurality of first services to obtain a semantic-correlated clustering result;

a fourth clustering submodule 705, configured to perform client-similarity clustering on the plurality of second services to obtain a client-similarity clustering result; and a merging submodule 706, configured to merge the time-correlated clustering result, the periodic clustering result, the semantic-correlated clustering result, and the client-similarity clustering result, to obtain the plurality of application types.

Optionally, the first clustering submodule 701 is configured to:

obtain, according to the flow table, a flow start time point in a flow entry in which each of the plurality of services is located;

determine a time difference between every two services in the plurality of services based on the obtained flow start time point;

determine time correlation between every two services in the plurality of services based on the determined time difference;

select, from the plurality of services based on the time correlation between every two services in the plurality of services, a service that meets a time correlation condition;

generate a similarity matrix based on the time correlation between the selected services;

determine a spectral clustering result of the plurality of services through spectral cluster analysis based on the similarity matrix;

determine a similarity between every two services in the plurality of services according to the domain name table; and determine the time-correlated clustering result based on the similarity between every two services in the plurality of services and the spectral clustering result.

Optionally, the second clustering submodule 702 is configured to:

for each of the plurality of services, obtain, according to the flow table, a flow start time point of the plurality of data flows of the service accessed by a same client;

determine a time difference between every two adjacent flow start time points based on a sequence of the flow start time points of the plurality of data flows of the accessed service;

determine whether a periodicity of the service is a strong periodicity through a Fourier transform based on the determined time difference; and if the periodicity of the service is a strong periodicity, determine that the service is a periodic service.

Optionally, the third clustering submodule 704 is configured to:

cluster the plurality of first services based on domain name semantic correlation to obtain a plurality of first clustering results;

combine the plurality of first clustering results based on domain name similarity between the plurality of first clustering results to obtain a plurality of second clustering results; and cluster an unclustered service and the plurality of second clustering results based on domain name semantic correlation between the unclustered service in the plurality of first services and each second clustering result, to obtain the semantic-correlated clustering result.

Optionally, the third clustering submodule 704 is further configured to:

obtain, from the plurality of first services, a plurality of third services that are accessed by a plurality of clients and correspond to a unique domain name, and obtain, from the plurality of first services, a plurality of fourth services that are accessed by a plurality of clients and correspond to a plurality of domain names;

obtain combinable domain names from the domain names corresponding to the plurality of fourth services and combine the combinable domain names to obtain a plurality of first domain names;

remove a number and a symbol from each first domain name and remove a number and a symbol from the domain name corresponding to each third service, to obtain a plurality of second domain names;

cluster services corresponding to the plurality of second domain names based on semantic correlation of the plurality of second domain names; and cluster services corresponding to domain names that are not combinable based on semantic correlation of the domain names that are not combinable in the domain names corresponding to the plurality of fourth services.

Optionally, the fourth clustering submodule 705 is configured to:

determine an IP address of a client accessing each of the plurality of second services; and cluster the plurality of second services based on intersection over union of the IP addresses of the clients accessing each second service, to obtain the client-similarity clustering result.

Optionally, the determining module 504 is configured to:
divide the plurality of application types into a first application group, a second application group, and a third application group, where a service included in each application type in the first application group corresponds to a domain name, a service included in each application type in the second application group does not correspond to a domain name, and each application type in the third application group corresponds to a service that is not clustered;
determine a label corresponding to each application type based on the domain name corresponding to the service included in each application type in the first application group; and
determine a label corresponding to each application type in the second application group and a label corresponding to each application type in the third application group.

In this embodiment of this application, the network device may perform flow behavior feature analysis according to the flow table to obtain the plurality of services. Each service includes one IP address and one port identifier, and one application may usually include a group of services. Therefore, after the plurality of services are clustered according to the flow table and the domain name table, the plurality of application types may be obtained, where each application type includes a plurality of services and each application type corresponds to one application. In this case, a label corresponding to each of the plurality of application types may be determined. Therefore, the label may be used to identify an application to which a data flow belongs. In this embodiment, an application may be identified based on a flow behavior feature without a traffic feature database. In this case, when a new application appears, the new application may be directly identified based on an IP address and a port of a server accessed by the new application. This improves an application identification rate.

When the apparatus for application identification provided in the foregoing embodiment identifies an application, division into the foregoing functional modules is merely used as an example for description. During actual application, the foregoing functions may be allocated to different functional modules for implementation based on a requirement. An internal structure of the apparatus is divided into different functional modules, to implement all or some of the functions described above. In addition, the apparatus for application identification provided in the foregoing embodiment and the method for application identification embodiments pertain to a same concept. For a specific implementation process thereof, refer to the method embodiments. Details are not described herein again.

All or some of the embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedures or functions according to the embodiments of this application are fully or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired or wireless manner. The computer-readable storage medium may be any usable medium accessible by the computer, or may be a data storage device, such as a server or a data center, integrating one or more usable media.

It should be understood that "a plurality of" in this specification means two or more than two. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, to clearly describe the technical solutions in the embodiments of this application, terms such as "first" and "second" are used in embodiments of this application to distinguish between same items or similar items that have basically same functions and purposes. A person skilled in the art may understand that the terms such as "first" and "second" do not limit a quantity and an execution sequence, and the terms such as "first" and "second" do not indicate a definite difference.

The foregoing descriptions are embodiments provided in this application, but are not intended to limit this application. Any modification, equivalent replacement, or improvement made without departing from the principle of this application shall fall within the protection scope of this application.

What is claimed is:

1. A method for application identification, the method comprising:
separately extracting features from a plurality of data flows to obtain a flow table and a domain name table, the flow table comprising a plurality of flow entries, each flow entry of the plurality of flow entries comprises a 5-tuple and a flow start time point, the domain name table comprises a plurality of domain name entries, each domain name entry of the plurality of domain name entries comprises a source Internet Protocol (IP) address, a destination domain name, a destination IP address, and a domain name type;
performing flow behavior feature analysis according to the flow table to obtain a plurality of services, each service comprising one IP address and one port identifier;
clustering the plurality of services according to the flow table and the domain name table to obtain a plurality of application types; and
determining a label corresponding to each of the plurality of application types, the label identifying an application to which a data flow belongs.

2. The method according to claim 1, wherein the performing the flow behavior feature analysis according to the flow table to obtain the plurality of services comprises:
determining a port with a loop according to the flow table to obtain a loop port set;
determining a single-client access service set and a first multi-client access service set based on the loop port set and according to the flow table, wherein each service in the single-client access service set is accessed by a single client, an IP address and a port of the service belong to a same side, the port does not belong to the loop port set, each service in the first multi-client access service set is accessed by a plurality of clients, the IP address and the port of the service belong to the same side, and the port does not belong to the loop port set;

determining a second multi-client access service set based on the loop port set and the first multi-client access service set and according to the flow table, wherein each service in the second multi-client access service set is accessed by a plurality of clients, the IP address and the port of the service belong to different sides, and the port does not belong to the loop port set; and combining the first multi-client access service set, the second multi-client access service set, and the single-client access service set to obtain the plurality of services.

3. The method according to claim 2, wherein the determining the port with the loop according to the flow table comprises:

obtaining, for each port in the flow table, a same-side IP address set and a peer-side IP address set according to the flow table;

determining an intersection between the same-side IP address set and the peer-side IP address set to obtain a plurality of IP addresses;

determining, according to the flow table, a total flow quantity of data flows that correspond to the plurality of IP addresses and that are in all data flows passing through the port, and using the determined total flow quantity as a first total flow quantity;

if the first total flow quantity is greater than a first threshold, determining a total flow quantity of all data flows passing through the port, and using the determined total flow quantity as a second total flow quantity; and if a ratio of the first total flow quantity to the second total flow quantity is greater than a second threshold, determining that the port is the port with the loop.

4. The method according to claim 2, wherein the determining the single-client access service set and the first multi-client access service set based on the loop port set and according to the flow table comprises:

determining, according to the flow table, the service that is accessed by a single client and whose IP address and port belong to a same side, the service that is accessed by a plurality of clients and whose IP address and port belong to a same side, to obtain a potential single-client access service set and a first potential multi-client access service set;

selecting, from the potential single-client access service set, the service at which the port in the loop port set is located to obtain the single-client access service set; and selecting, from the first potential multi-client access service set, the service at which the port in the loop port set is located to obtain the first multi-client access service set.

5. The method according to claim 4, wherein the determining, according to the flow table, the service that is accessed by the single client and whose IP address and port belong to the same side, and a service that is accessed by the plurality of clients and whose IP address and port belong to the same side comprises:

determining a plurality of target services according to the flow table, each target service corresponding to an IP address and a port in one flow entry that belong to a same side, and each target service corresponds to the plurality of data flows;

determining, for each of the plurality of target services, whether a port of the target service is randomly generated;

if the port of the target service is randomly generated, determining whether a quantity of same-side ports corresponding to the IP address of the target service is greater than a third threshold;

if the quantity of same-side ports corresponding to the IP address of the target service is greater than the third threshold, determining whether a quantity of peer-side ports corresponding to the target service is greater than a fourth threshold;

if the quantity of peer-side ports corresponding to the target service is greater than the fourth threshold, determining that the target service is the service that is accessed by the plurality of clients and whose IP address and port belong to the same side; or if the quantity of peer-side ports corresponding to the target service is not greater than the fourth threshold, determining whether a peer-side IP address of the target service is unique; and if the peer-side IP address of the target service is unique, determining that the target service is the service that is accessed by the single client and whose IP address and port belong to the same side.

6. The method according to claim 5, wherein the determining whether the port of the target service is randomly generated further comprises:

if the port of the target service is not randomly generated, determining that the target service is the service that is accessed by the plurality of clients and whose IP address and port belong to the same side.

7. The method according to claim 5, wherein after the determining whether the quantity of same-side ports corresponding to the IP address of the target service is greater than the third threshold, the method further comprises:

if the quantity of same-side ports corresponding to the IP address of the target service is not greater than the third threshold, determining that the target service is the service that is accessed by the plurality of clients and whose IP address and port belong to the same side.

8. The method according to claim 2, wherein the determining the second multi-client access service set based on the loop port set and the first multi-client access service set and according to the flow table comprises:

determining, based on the first multi-client access service set and according to the flow table, the service that is accessed by a plurality of clients and whose IP address and port belong to different sides, to obtain the second potential multi-client access service set; and selecting, from the second potential multi-client access service set, the service at which the port in the loop port set is located, to obtain the second multi-client access service set.

9. The method according to claim 8, wherein the determining, based on the first multi-client access service set and according to the flow table, the service that is accessed by a plurality of clients and whose IP address and port belong to different sides comprises:

determining an IP address and a port that are in a same flow entry in the flow table and that belong to the different sides as one reference service, to obtain a plurality of reference services;

determining, for each of the plurality of reference services, whether the reference service corresponds to the plurality of data flows;

if the reference service corresponds to the plurality of data flows, determining whether a port of the reference service is randomly generated;

if the port of the reference service is not randomly generated, determining whether the port of the reference service is comprised in the first multi-client access service set;

if the port of the reference service is not comprised in the first multi-client access service set, determining whether an IP address of the reference service is comprised in the source IP addresses in the domain name table; and if the IP address of the reference service is not comprised in the source IP addresses in the domain name table, determine that the reference service is the service that is accessed by the plurality of clients and whose IP address and port belong to different sides.

10. The method according to claim 1, wherein the clustering the plurality of services according to the flow table and the domain name table, to obtain the plurality of application types comprises:

performing time-correlated clustering on the plurality of services according to the flow table and the domain name table, to obtain a time-correlated clustering result;

selecting a periodic service from the plurality of services according to the flow table, to obtain a periodic clustering result;

obtaining a plurality of first services and a plurality of second services from the plurality of services according to the domain name table, wherein the plurality of first services are services that are accessed by a plurality of clients and that correspond to domain names, and the plurality of second services comprise the service that is accessed by a plurality of clients and that does not correspond to a domain name and the service that is accessed by a single client;

performing semantic-correlated clustering on the plurality of first services, to obtain a semantic-correlated clustering result;

performing client-similarity clustering on the plurality of second services, to obtain a client-similarity clustering result; and merging the time-correlated clustering result, the periodic clustering result, the semantic-correlated clustering result, and the client-similarity clustering result, to obtain the plurality of application types.

11. The method according to claim 1, wherein the determining a label corresponding to each of the plurality of application types comprises:

dividing the plurality of application types into a first application group, a second application group, and a third application group, wherein a service comprised in each application type in the first application group corresponds to a domain name, the service comprised in each application type in the second application group does not correspond to a domain name, and each application type in the third application group corresponds to a service that is not clustered;

determining a label corresponding to each application type based on the domain name corresponding to the service comprised in each application type in the first application group; and determining a label corresponding to each application type in the second application group and the label corresponding to each application type in the third application group.

12. An apparatus for application identification, the apparatus comprising:

a memory storing instructions; and at least one processor in communication with the memory, the at least one processor configured, upon execution of the instructions, to perform the following steps:

separately extract features from a plurality of data flows to obtain a flow table and a domain name table, the flow table comprising a plurality of flow entries, each flow entry of the plurality of flow entries comprises a 5-tuple and a flow start time point, the domain name table comprises a plurality of domain name entries, each domain name entry of the plurality of domain name entries comprises a source Internet Protocol, IP, address, a destination domain name, a destination IP address, and a domain name type;

perform flow behavior feature analysis according to the flow table to obtain a plurality of services, each service comprising one IP address and one port identifier;

cluster the plurality of services according to the flow table and the domain name table to obtain a plurality of application types; and determine a label corresponding to each of the plurality of application types, the label identifying an application to which a data flow belongs.

13. The apparatus according to claim 12, wherein the at least one processor is further configured to execute the program instructions to:

determine a port with a loop according to the flow table to obtain a loop port set;

determine a single-client access service set and a first multi-client access service set based on the loop port set and according to the flow table, wherein each service in the single-client access service set is accessed by a single client, an IP address and a port of the service belong to a same side, the port does not belong to the loop port set, each service in the first multi-client access service set is accessed by a plurality of clients, the IP address and the port of the service belong to a same side, and the port does not belong to the loop port set;

determine a second multi-client access service set based on the loop port set and the first multi-client access service set and according to the flow table, wherein each service in the second multi-client access service set is accessed by a plurality of clients, the IP address and the port of the service belong to different sides, and the port does not belong to the loop port set; and combine the first multi-client access service set, the second multi-client access service set, and the single-client access service set, to obtain the plurality of services.

14. The apparatus according to claim 13, wherein the at least one processor is further configured to execute the program instructions to:

obtain, for each port in the flow table, a same-side IP address set and a peer-side IP address set according to the flow table;

determine an intersection between the same-side IP address set and the peer-side IP address set to obtain a plurality of IP addresses;

determine, according to the flow table, a total flow quantity of data flows that correspond to the plurality of IP addresses and that are in all data flows passing through the port, and use the determined total flow quantity as a first total flow quantity;

if the first total flow quantity is greater than a first threshold, determine a total flow quantity of all data flows passing through the port, and use the determined total flow quantity as a second total flow quantity; and
if a ratio of the first total flow quantity to the second total flow quantity is greater than a second threshold, determine that the port is the port with the loop.

15. The apparatus according to claim 13, wherein the at least one processor is further configured to execute the program instructions to:
determine, according to the flow table, the service that is accessed by a single client and whose IP address and port belong to a same side, the service that is accessed by a plurality of clients and whose IP address and port belong to a same side, to obtain a potential single-client access service set and a first potential multi-client access service set;
select, from the potential single-client access service set, the service at which the port in the loop port set is located to obtain the single-client access service set; and
select, from the first potential multi-client access service set, the service at which the port in the loop port set is located to obtain the first multi-client access service set.

16. The apparatus according to claim 15, wherein the at least one processor is further configured to execute the program instructions to:
determine a plurality of target services according to the flow table, each target service corresponding to an IP address and a port in one flow entry that belong to a same side, and each target service corresponds to the plurality of data flows;
determine, for each of the plurality of target services, whether a port of the target service is randomly generated;
if the port of the target service is randomly generated, determine whether a quantity of same-side ports corresponding to the IP address of the target service is greater than a third threshold;
if the quantity of same-side ports corresponding to the IP address of the target service is greater than the third threshold, determine whether a quantity of peer-side ports corresponding to the target service is greater than a fourth threshold;
if the quantity of peer-side ports corresponding to the target service is greater than the fourth threshold, determine that the target service is the service that is accessed by the plurality of clients and whose IP address and port belong to the same side; or if the quantity of peer-side ports corresponding to the target service is not greater than the fourth threshold, determine whether a peer-side IP address of the target service is unique; and
if the peer-side IP address of the target service is unique, determining that the target service is the service that is accessed by the single client and whose IP address and port belong to the same side.

17. The apparatus according to claim 16, wherein the at least one processor is further configured to execute the program instructions to:
if the port of the target service is not randomly generated, determine that the target service is the service that is accessed by the plurality of clients and whose IP address and port belong to the same side.

18. The apparatus according to claim 16, wherein the at least one processor is further configured to execute the program instructions to:
if the quantity of same-side ports corresponding to the IP address of the target service is not greater than the third threshold, determine that the target service is the service that is accessed by the plurality of clients and whose IP address and port belong to the same side.

19. The apparatus according to claim 13, wherein the at least one processor is further configured to execute the program instructions to:
determine, based on the first multi-client access service set and according to the flow table, the service that is accessed by a plurality of clients and whose IP address and port belong to different sides, to obtain the second potential multi-client access service set; and
select, from the second potential multi-client access service set, the service at which the port in the loop port set is located, to obtain the second multi-client access service set.

20. The apparatus according to claim 19, wherein the at least one processor is further configured to execute the program instructions to:
determine an IP address and a port that are in a same flow entry in the flow table and that belong to the different sides as one reference service, to obtain a plurality of reference services;
determine, for each of the plurality of reference services, whether the reference service corresponds to the plurality of data flows;
if the reference service corresponds to the plurality of data flows, determine whether a port of the reference service is randomly generated;
if the port of the reference service is not randomly generated, determine whether the port of the reference service is comprised in the first multi-client access service set;
if the port of the reference service is not comprised in the first multi-client access service set, determine whether an IP address of the reference service is comprised in the source IP addresses in the domain name table; and
if the IP address of the reference service is not comprised in the source IP addresses in the domain name table, determine that the reference service is the service that is accessed by the plurality of clients and whose IP address and port belong to different sides.

* * * * *